US008806594B2

(12) United States Patent
Ueno et al.

(10) Patent No.: US 8,806,594 B2
(45) Date of Patent: Aug. 12, 2014

(54) IMAGE FORMING APPARATUS, AUTHENTICATION INFORMATION MANAGING SYSTEM, AUTHENTICATION INFORMATION MANAGING METHOD, AND AUTHENTICATION INFORMATION MANAGING PROGRAM

(75) Inventors: Kazuhiro Ueno, Koganei (JP); Atsushi Daigo, Asaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 504 days.

(21) Appl. No.: 13/119,234

(22) PCT Filed: Sep. 29, 2009

(86) PCT No.: PCT/JP2009/067307
§ 371 (c)(1),
(2), (4) Date: Mar. 16, 2011

(87) PCT Pub. No.: WO2010/038889
PCT Pub. Date: Apr. 8, 2010

(65) Prior Publication Data
US 2011/0173686 A1    Jul. 14, 2011

(30) Foreign Application Priority Data

Sep. 30, 2008  (JP) ................................ 2008-253382
Oct. 31, 2008  (JP) ................................ 2008-281196

(51) Int. Cl.
G06F 7/04       (2006.01)
G06F 15/16      (2006.01)
G06F 17/30      (2006.01)
H04L 29/06      (2006.01)

(52) U.S. Cl.
USPC ....... 726/6; 726/5; 726/18; 713/150; 713/168

(58) Field of Classification Search
USPC .................. 726/2–7, 9, 16–21; 713/150, 168
See application file for complete search history.

(56) References Cited

U.S. PATENT DOCUMENTS 6,731,731 B1 *  5/2004  Ueshima ........................ 379/196
7,694,137 B2 *  4/2010  Matsuya ........................ 713/168

(Continued)

FOREIGN PATENT DOCUMENTS

JP    2002-324219    11/2002
JP    2003-085483    3/2003

(Continued)

OTHER PUBLICATIONS

"Login with Card" *Function*, Sony Corporation, published at http://www.mysony.sony.co.jp/whats/whats 0004.html (retrieved on Nov. 4, 2009).

*Primary Examiner* — Jeffrey Pwu
*Assistant Examiner* — Jayesh Jhaveri
(74) *Attorney, Agent, or Firm* — Fitzpatrick, Cella, Harper & Scinto

(57) ABSTRACT

An image forming apparatus communicates with an authenticating server which stores user information for identifying a user and authentication information included in a storing medium. An authentication requesting unit transmits the user information input to the image forming apparatus to the authenticating server to authenticate the user. An authentication result obtaining unit obtains the user authentication result from the authenticating server. A display unit displays a registering mode for registering the authentication information corresponding to the input user information and a deleting mode for deleting the authentication information corresponding to the input user information so that the modes can be selected according to the obtained authentication result. When the deleting mode has been selected, the authentication information deletion instructing unit instructs the authenticating server to delete one or a plurality of authentication information corresponding to the user information in response to a deleting instruction by the user.

7 Claims, 30 Drawing Sheets

(56) References Cited

U.S. PATENT DOCUMENTS

| | | | |
|---|---|---|---|
| 7,730,526 B2* | 6/2010 | Lamplough | 726/9 |
| 8,001,593 B2* | 8/2011 | Uno | 726/20 |
| 8,042,191 B2* | 10/2011 | Yururi | 726/27 |
| 2002/0026397 A1* | 2/2002 | Ieta et al. | 705/35 |
| 2006/0015730 A1 | 1/2006 | Yuhara | 713/175 |
| 2006/0277599 A1* | 12/2006 | Lamplough | 726/5 |
| 2007/0089173 A1* | 4/2007 | Hikichi et al. | 726/26 |
| 2008/0168542 A1* | 7/2008 | Sato | 726/5 |
| 2008/0178265 A1* | 7/2008 | Tsuchiya et al. | 726/3 |
| 2008/0201771 A1* | 8/2008 | Ueda | 726/7 |
| 2008/0231887 A1* | 9/2008 | Sakagami et al. | 358/1.15 |
| 2012/0096530 A1* | 4/2012 | Hirose | 726/7 |

FOREIGN PATENT DOCUMENTS

| | | |
|---|---|---|
| JP | 2003-272037 | 9/2003 |
| JP | 2005-010847 | 1/2005 |
| JP | 2006-099714 | 4/2006 |
| JP | 2007-141172 | 6/2007 |
| JP | 2008-097207 | 4/2008 |
| JP | 2008-181491 | 8/2008 |
| WO | 2005/021904 | 3/2005 |

* cited by examiner

FIG. 12

CARD INFORMATION READING DISPLAY SCREEN
1200

REGISTRATION OF CARD INFORMATION

CARD INFORMATION IS REGISTERED INTO
AUTHENTICATION SERVICE.
TOUCH CARD WHICH IS REGISTERED
TO CARD READER.

1201   1203

◄ BACK      OK ►

FIG. 13

CARD REGISTRATION/CARD NAME INPUT DISPLAY SCREEN
1300

REGISTRATION OF CARD INFORMATION

CARD INFORMATION IS REGISTERED INTO
AUTHENTICATION SERVICE.
PRESS "OK" BUTTON IF YOU WANT.

CARD INFORMATION: 2008055D275A     1301
CARD NAME: _____

1303   1305

◄ BACK      OK ►

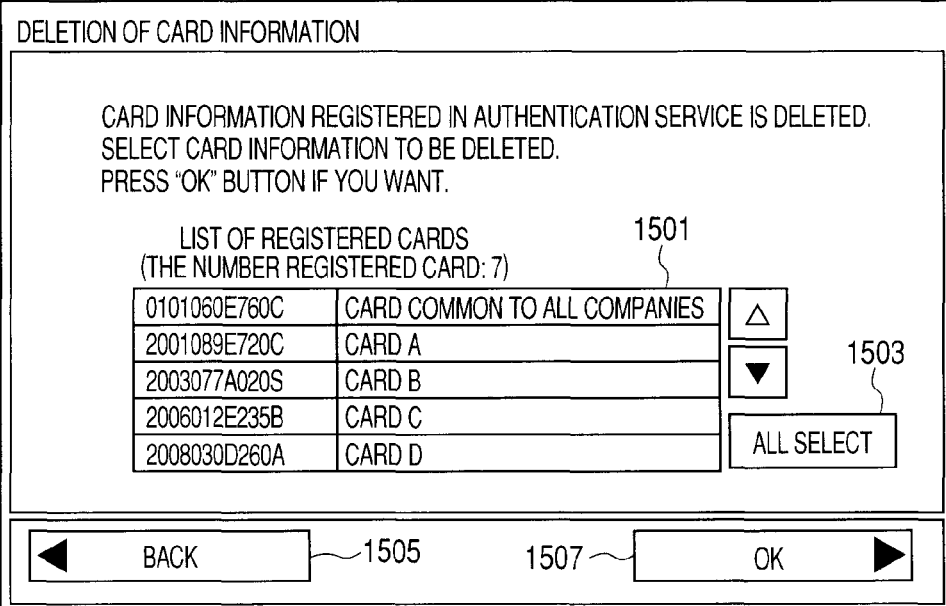
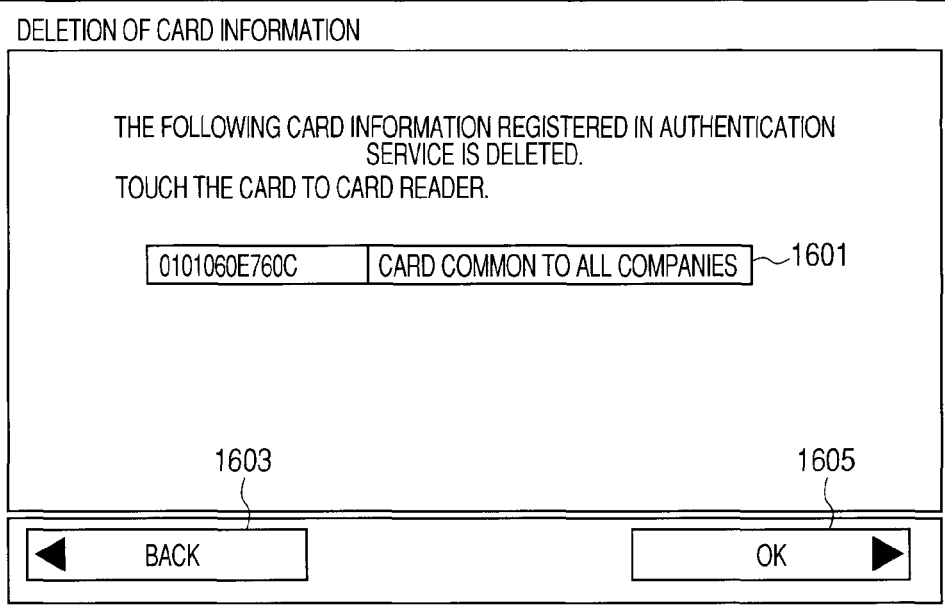

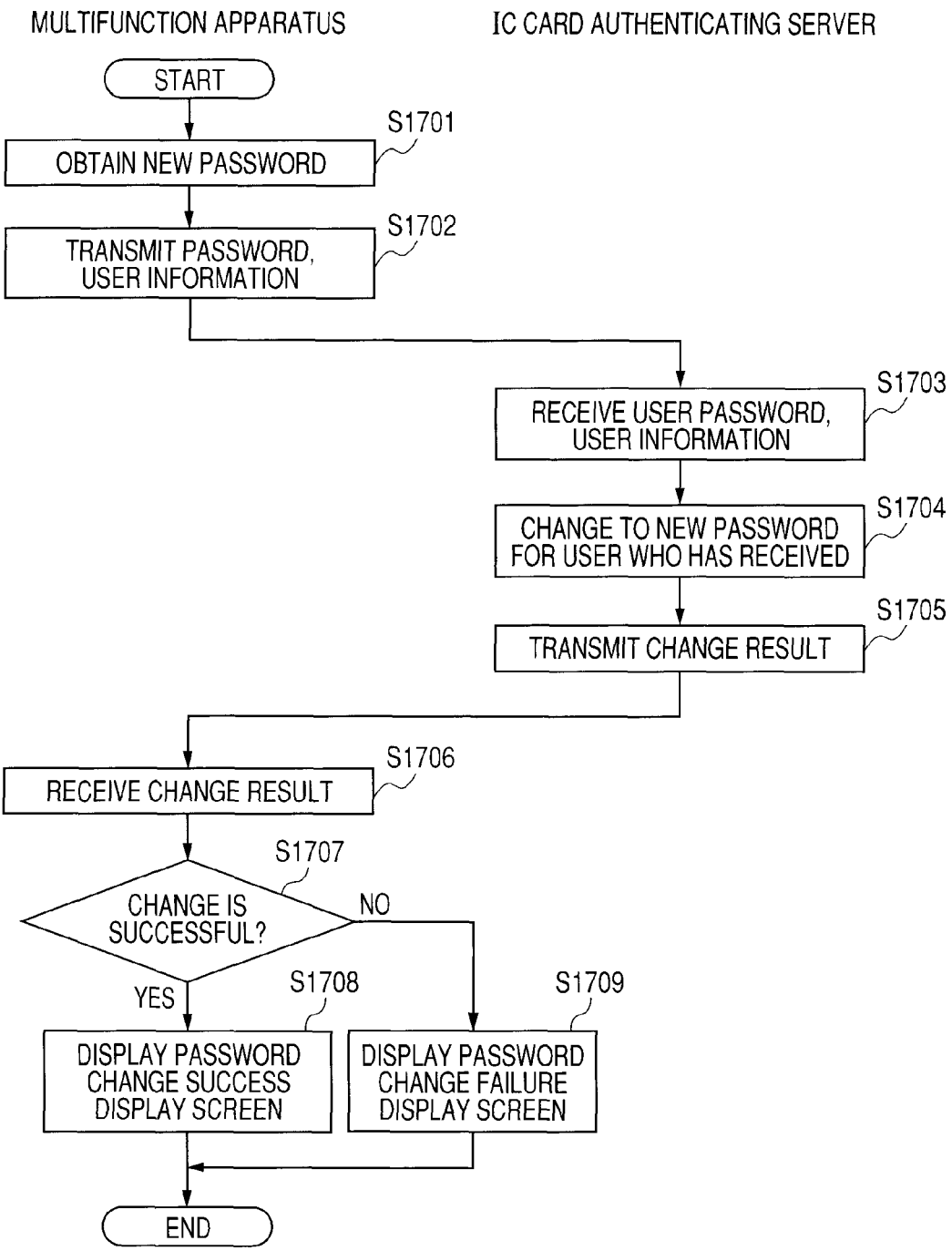

PASSWORD CHANGE DISPLAY SCREEN
1800

| 0000001 |
| 0000002 |
| 0000003 |
| ... |
| ABCDEFG |

FIG. 29

USER RESTRICTION INFORMATION

| DEVICE FUNCTION | FUNCTION | | RESTRICTION VALUE |
|---|---|---|---|
| | PRINT (PrintCategory) | | PERMIT (Permit)<br>DENY (Deny) |
| DEVICE FUNCTION (ApplicationCategory) | COPY (CopyCategory) | | PERMIT (Permit)<br>DENY (Deny) |
| | TRANSMISSION (SendCategory) | | PERMIT (Permit)<br>DENY (Deny) |
| | BOX (BoxCategory) | | PERMIT (Permit)<br>DENY (Deny) |
| | WEB BROWSER (BrowserCategory) | | PERMIT (Permit)<br>DENY (Deny) |
| | UTILITY (UtilityCategory) | | PERMIT (Permit)<br>DENY (Deny) |
| | OTHERS (DefaultCategory) | | PERMIT (Permit)<br>DENY (Deny) |
| COPYING FUNCTION (Copy) | COLOR COPY (ColorCopy) | | NO RESTRICTION (Color)<br>FULL COLOR COPY INHIBITED (BiColor)<br>FULL COLOR/BICOLOR COPY INHIBITED (UniColor)<br>MONOCHROMATIC COPY ONLY (Bw) |
| | COPYING METHOD (Simplex) | | SIMPLEX COPY (Permit)<br>FORCED DUPLEX COPY (Deny) |
| | PAGE LAYOUT (Nup) | | NO RESTRICTION (1)<br>1 PAGE/SHEET INHIBITED (2)<br>1 - 2 PAGES/SHEET INHIBITED (4) |
| SCANNING FUNCTION (Scan) | SCAN (ScanFlag) | | PERMIT (Permit)<br>DENY (Deny) |
| | COLOR SCAN (ColorScan) | | PERMIT (Color)<br>DENY (Bw) |
| | ... | | |
| PRINTING FUNCTION (PdlPrint) 2001 | PRINTING (PdlPrintFlag) | | PERMIT (Permit)<br>DENY (Deny) |
| | COLOR PRINTING (ColorPrint) | | COLOR PRINTING (Color)<br>FORCED MONOCHROMATIC PRINTING (Bw) |
| | PRINTING METHOD (Simplex) | | SIMPLEX PRINTING (Permit)<br>FORCED DUPLEX PRINTING (Deny) |
| | PAGE LAYOUT (Nup) | | NO RESTRICTION (1)<br>1 PAGE/SHEET INHIBITED (2)<br>1 - 2 PAGES/SHEET INHIBITED (4) | ial
IMAGE FORMING APPARATUS, AUTHENTICATION INFORMATION MANAGING SYSTEM, AUTHENTICATION INFORMATION MANAGING METHOD, AND AUTHENTICATION INFORMATION MANAGING PROGRAM

TECHNICAL FIELD

The invention relates to an image forming apparatus and an authentication information managing system for managing authentication information and, further, to a method and a program for managing authentication information.

BACKGROUND ART

In recent years, there has been known a print system of what is called a "pull-print (storage print)" in which the user issues a print request from a printing apparatus to print data which has temporarily been stored in a server, thereby outputting the print data from the printing apparatus. Thus, the user can output the print data from a desired printing apparatus instead of an output to a specific printing apparatus from an application upon printing (Japanese Patent Application Laid-Open No. 2006-099714).

There can be also considered a system in which when a multifunction apparatus is used, in order to limit the user, for example, an IC card is put over a card reader of the multifunction apparatus, thereby inquiring of an authentication information managing apparatus (IC card authenticating server) about authentication information read out of the IC card, and if the authentication information has been registered, a response showing a success in the authentication is made to the multifunction apparatus, thereby enabling the multifunction apparatus to be used. According to such a system, card information (authentication information to permit use of the multifunction apparatus) of the IC card has to be preliminarily registered into the authentication information managing apparatus and a troublesomeness of an administrator is needed. Therefore, a system in which if card information is not registered at the time of authenticating an IC card, the user who uses the IC card registers the IC card into the multifunction apparatus is disclosed in Japanese Patent Application Laid-Open No. 2008-181491.

The system disclosed in Japanese Patent Application Laid-Open No. 2008-181491 is such a system that if the card information is not registered at the time of authenticating the IC card, the IC card is registered, and only one card information can be registered for one user. However, at present, for example, there is a case where the user has a personal IC card and a plurality of IC cards for divisions in a company and selectively uses them on businesses in the company. In the case of switching (shifting) from the old card to a new card, a case where one user holds both of the old card and the new card for a predetermined period of time exists. In the system of Japanese Patent Application Laid-Open No. 2008-181491, a plurality of IC cards cannot be registered for one user. When the new card is registered, the previous card cannot be used. Therefore, in such a case, there is a case where the system of Japanese Patent Application Laid-Open No. 2008-181491 is not suitable for businesses. In the system of Japanese Patent Application Laid-Open No. 2008-181491, only one card information is provided for one user and maintenance of the registered card information is easy. However, in the case of enabling a plurality of IC cards to be used, complicated work is required for maintenance such as a deletion or the like.

DISCLOSURE OF THE INVENTION

According to one aspect of the invention, there is disclosed an image forming apparatus which is connected to an authenticating server in which user information for identifying a user and one or a plurality of authentication information included in a storing medium have been stored in correspondence to each other so that the apparatus can communicate with the authenticating server through a communication medium, characterized by comprising:

a user authentication requesting unit that transmits the user information which has been input to the image forming apparatus to the authenticating server in order to authenticate the user;

a user authentication result obtaining unit that obtains a result of the user authentication from the authenticating server;

a display unit that displays a registering mode for registering the authentication information corresponding to the input user information and a deleting mode for deleting the authentication information corresponding to the input user information so that the modes can be selected according to the authentication result obtained by the user authentication result obtaining unit; and an authentication information deletion instructing unit that, when the deleting mode has been selected, instructs the authenticating server to delete one or a plurality of authentication information corresponding to the user information in response to a deleting instruction by the user.

Other features and advantages of the present invention will be apparent from the following description taken in conjunction with the accompanying drawings, in which like reference characters designate the same or similar parts throughout thereof.

BRIEF DESCRIPTION OF THE DRAWINGS

FIG. 12 is a diagram illustrating a card information reading display screen 1200 at the time of registering the card information in the authentication information managing system 1 of the invention.

FIG. 13 is a diagram illustrating a card registration/card name input display screen 1300 in the authentication information managing system 1 of the invention.

FIG. 15 is a diagram illustrating a card information deletion display screen 1500 in the authentication information managing system 1 of the invention.

FIG. 16 is a diagram illustrating a card information reading display screen 1600 at the time of deleting the card information in the authentication information managing system 1 of the invention.

FIG. 17 is a flowchart illustrating an example of a control procedure at the time of changing a password in the authentication information managing system 1 of the invention.

FIG. 29 is a diagram illustrating an example of use restriction information as role information in the IC card authenticating table which is managed in the authenticating server 2000.

BEST MODE FOR CARRYING OUT THE INVENTION

An embodiment of the invention will be described in detail hereinbelow with reference to the drawings.

Figure 1:
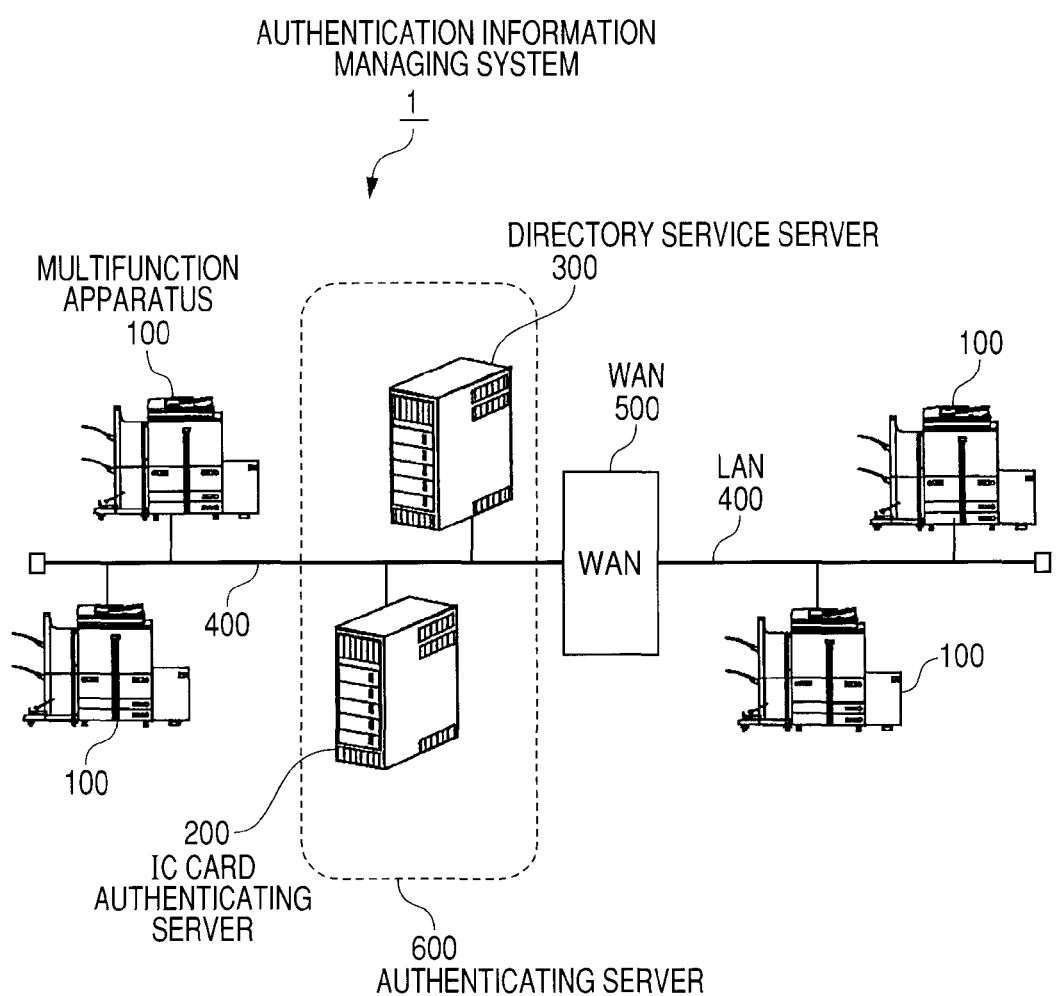
FIG. 1 is a system constructional diagram illustrating an example of a construction of an authentication information managing system 1 of the invention.

FIG. 1 is a system constructional diagram illustrating an example of a construction of an authentication information managing system 1 of the invention.

The authentication information managing system 1 of the embodiment has a construction in which one or a plurality of multifunction apparatuses 100, one or a plurality of IC card authenticating servers 200, and one or a plurality of directory service servers 300 are connected through a LAN (Local Area Network) 400 or a WAN (Wide Area Network) 500.

As will be described hereinafter, the IC card authenticating server 200 and the directory service server 300 can be collectively regarded as an authenticating server 600.

The multifunction apparatus 100 (image forming apparatus) has various functions such as printing and the like. The multifunction apparatus 100 transmits user information and card information (authentication information) of an IC card to the IC card authenticating server 200 and makes an authenticating request or the like. In the embodiment, the card information of the IC card is key information for permitting use of the multifunction apparatus 100.

The IC card authenticating server 200 stores a table for authenticating the IC card (illustrated in FIG. 10, which will be described hereinafter) and executes an authenticating process by using the IC card authenticating table according to the authenticating request by the IC card from the multifunction apparatus 100 or an authenticating request by a user name and a password.

The directory service server 300 unitarily stores and manages: hardware resources such as servers, clients, and the like existing on a network; and information such as attributes (for example, a log-in user name and a password of Windows (registered trademark) of Microsoft Corporation), an access right, and the like of the user who uses them. The directory service server 300 is, for example, a server in which an Active Directory (registered trademark) function has been installed or an LDAP (Lightweight Directory Access Protocol) server.

Figure 2:
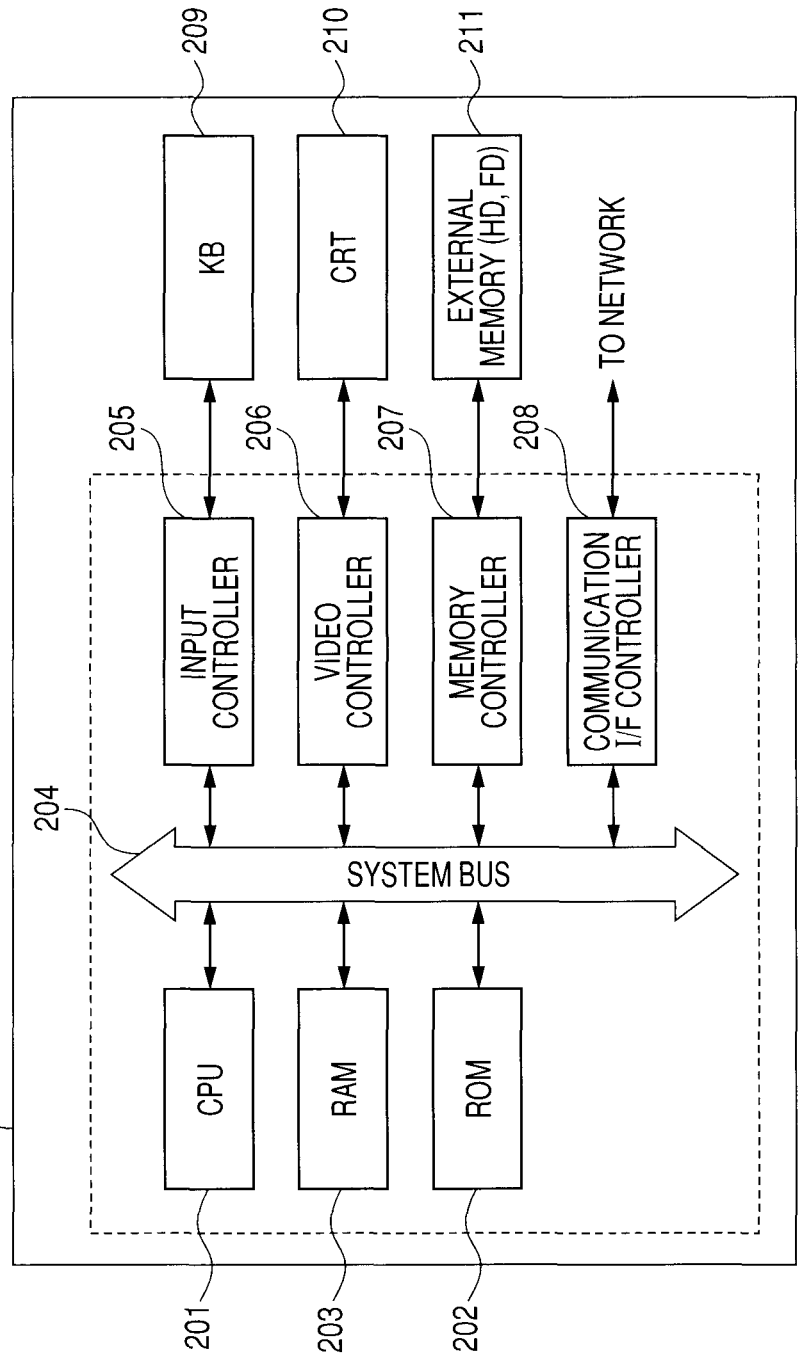
FIG. 2 is a block diagram illustrating a hardware construction of an information processing apparatus which can be applied to an IC card authenticating server 200 and a directory service server 300.

A hardware construction of an information processing apparatus which can be applied to the IC card authenticating server 200 and the directory service server 300 illustrated in FIG. 1 will be described hereinbelow by using FIG. 2. FIG. 2 is a block diagram illustrating the hardware construction of the information processing apparatus which can be applied to the IC card authenticating server 200 and the directory service server 300 illustrated in FIG. 1.

In FIG. 2, a CPU 201 integratedly controls each device and controllers which are connected to a system bus 204. A BIOS (Basic Input/Output System) serving as a control program of the CPU 201, an operating system program (hereinbelow, abbreviated to OS), various kinds of programs, which will be described hereinafter, necessary for realizing functions which are executed by each server or each PC, and the like have been stored in a ROM 202 or an external memory 211.

A RAM 203 functions as a main memory, a work area, or the like of the CPU 201. The CPU 201 loads the programs or the like necessary for executing processes into the RAM 203 from the ROM 202 or the external memory 211 and executes the loaded programs, thereby realizing various kinds of operations.

An input controller 205 controls an input from a keyboard (KB) 209, a pointing device such as a mouse (not shown), or the like. A video controller 206 controls a display to a display device such as a CRT display (CRT) 210 or the like. Although the CRT 210 is illustrated in FIG. 2, the display device is not limited only to the CRT but may be another display device such as a liquid crystal display or the like. The administrator uses those display devices as necessary.

A memory controller 207 controls an access to the external memory 211 such as external storing device (hard disk (HD)) for storing a boot program, various kinds of applications, font data, user file, edition file, various kinds of data, and the like, flexible disk (FD), compact flash (registered trademark) memory which is connected to a PCMCIA card slot through an adapter, or the like.

A communication I/F controller 208 is connected to and communicates with an external apparatus through a network (for example, LAN 400 illustrated in FIG. 1) and executes a communication control process on the network. For example, communication using the TCP/IP can be performed.

The CPU 201 executes, for example, a developing (rasterizing) process of an outline font into an area for display information in the RAM 203, thereby enabling the data to be displayed on the CRT 210. The CPU 201 also enables the user to instruct by using a mouse cursor or the like (not shown) on the CRT 210.

The various kinds of programs (for example, authentication information managing program), which will be described hereinafter, for realizing the invention have been recorded in the external memory 211. The programs are loaded into the RAM 203 as necessary and executed by the CPU 201. Further, a definition file, various kinds of information tables, and the like which are used when executing the program have also been stored in the external memory 211 and will be also described in detail hereinbelow.

Figure 3:
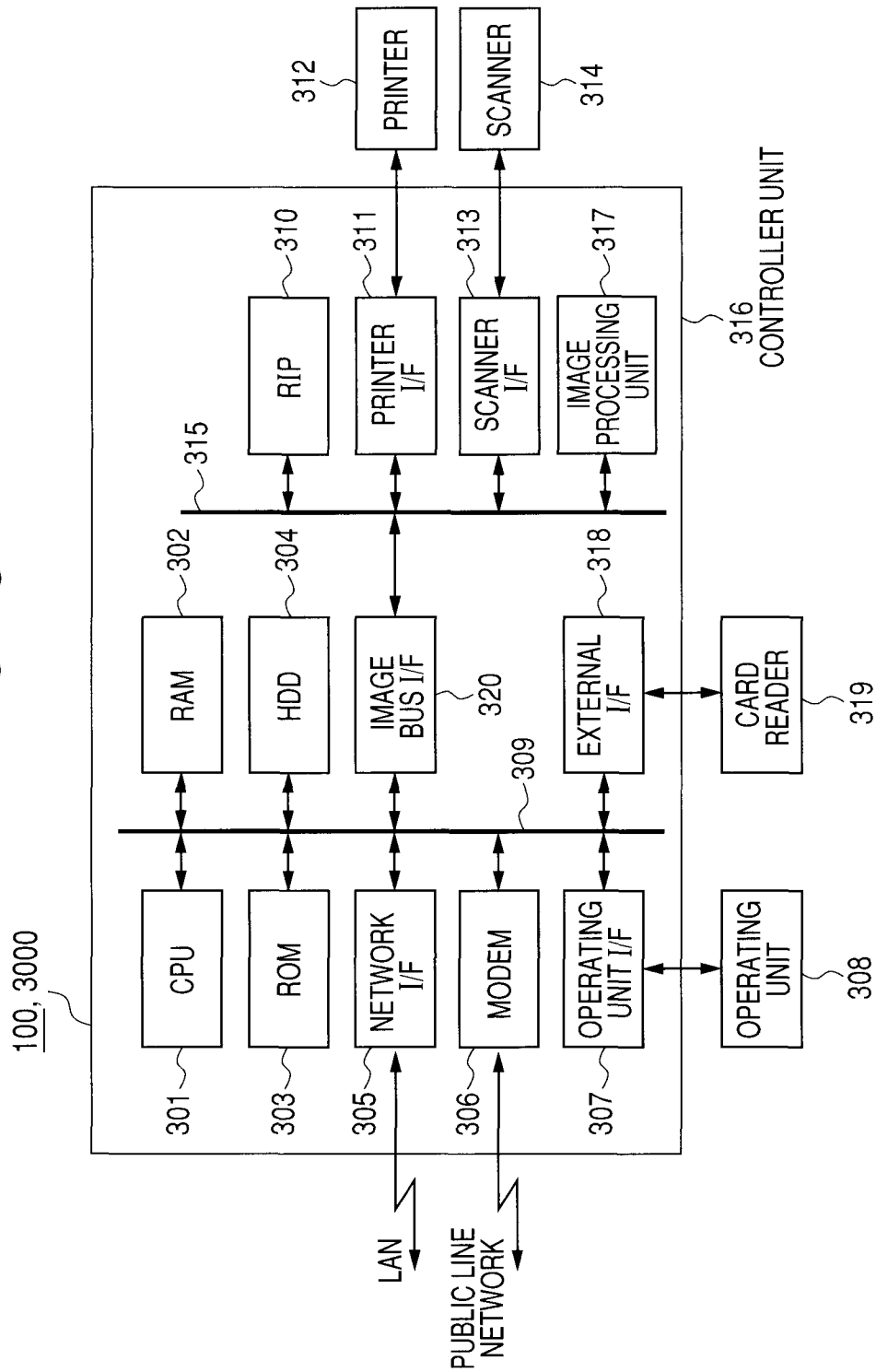
FIG. 3 is a block diagram illustrating an example of a hardware construction of a controller unit of a multifunction apparatus 100.

Subsequently, a hardware construction of a controller unit for controlling the multifunction apparatus 100 serving as an information processing apparatus of the invention will be described by using FIG. 3. FIG. 3 is a block diagram illustrating an example of the hardware construction of the controller unit of the multifunction apparatus 100 illustrated in FIG. 1.

In FIG. 3, a controller unit 316 is connected to a scanner 314 functioning as an image input device and a printer 312 functioning as an image output device and is also connected to a LAN (for example, LAN 400 illustrated in FIG. 1) or a public line (WAN) (for example, PSTN, ISDN (registered trademark), or the like), thereby inputting and outputting image data and device information.

In the controller unit 316, a CPU 301 is a processor for controlling the whole system. A RAM 302 is a system work memory for allowing the CPU 301 to operate and is a program memory for recording the program or an image memory for temporarily recording the image data.

The boot program and various kinds of control programs of the system have been stored in a ROM 303. An external storing device (hard disk drive (HDD)) 304 stores various kinds of programs (for example, authentication information managing program) for controlling the system, the image data, and the like.

An operating unit interface (operating unit I/F) 307 is an interface unit with an operating unit (UI) 308 and outputs the image data which is displayed onto the operating unit 308 to the operating unit 308. The operating unit I/F 307 plays a role for transferring information (for example, user information or the like) input by the system user from the operating unit 308 to the CPU 301. The operating unit 308 has a display unit having a touch panel and by pressing (touching with a finger or the like) a button displayed on the display unit, the user can make various kinds of instructions.

A network interface (Network I/F) 305 is connected to the network (LAN) and inputs and outputs data. A modem (MODEM) 306 is connected to the public line (WAN) and inputs and outputs data for transmission and reception of an FAX or the like.

An external interface (external I/F) 318 is an I/F unit for receiving an external input of a USB, IEEE1394, a printer port, RS-232C, or the like. In the embodiment, a card reader 319 for reading an IC card which is necessary upon authentication is connected to the external I/F 318. The CPU 301 controls the reading of the information from the IC card by the card reader 319 through the external I/F 318 and can obtain the information read out of the IC card. It is sufficient to use a storing medium which can permit the user to use the image forming apparatus without limiting to the IC card. In this case, individual key information (authentication information) for permitting the user to use the image forming apparatus is stored in the storing medium. The key information may be either a manufacturing number of the storing medium or a user code which is allocated to the user in the company.

The foregoing devices are arranged on a system bus 309.

An image bus interface (IMAGE BUS I/F) 320 is a bus bridge which connects the system bus 309 and an image bus 315 for transferring the image data at a high speed and converts a data structure.

The image bus 315 is constructed by a PCI bus or IEEE1394. The following devices are arranged on the image bus 315.

A raster image processor (RIP) 310 develops vector data of, for example, PDL codes or the like into a bitmap image. A printer interface (printer I/F) 311 connects the printer 312 and the controller unit 316 and executes a conversion of a synchronous system/asynchronous system of the image data. A scanner interface (scanner I/F) 313 connects the scanner 314 and the controller unit 316 and executes a conversion of the synchronous system/asynchronous system of the image data.

An image processing unit 317 executes a correction, modification, and edition to the input image data and executes a correction, resolution conversion, and the like of the printer to print output image data. In addition to them, the image processing unit 317 also executes a rotation of the image data, a compressing/decompressing process such as JPEG to multi-value image data, and a compressing/decompressing process such as JBIG, MMR, MH, or the like to binary image data.

The scanner 314 illuminates an image on paper serving as an original and scans the image by a CCD line sensor, thereby converting it into an electric signal as raster image data. Original sheets are set onto a tray of a document feeder. The apparatus user instructs a reading activation from the operating unit 308, so that the CPU 301 supplies the instruction to the scanner 314. The feeder feeds out the original sheets one by one and the reading operation of the original image is executed.

The printer 312 is a portion for converting the raster image data into the image on the sheet. As a converting system, there are an electrophotographic system using a photosensitive drum or a photosensitive belt, an ink jet system for directly printing the image onto the sheet by discharging ink from a micronozzle array, and the like and any one of them may be used. The activation of the printing operation is started by an instruction from the CPU 301. The printer 312 has a plurality of sheet feeding stages so that different sheet sizes or different sheet orientations can be selected and sheet cassettes corresponding to them are provided.

The operating unit 308 has an LCD display unit. A touch panel sheet is adhered onto the LCD and an operating display screen of the system is displayed on the LCD display unit. When a displayed key is pressed, its position information is transferred to the CPU 301 through the operating unit I/F 307. As various kinds of operating keys, for example, a start key, a stop key, an ID key, a reset key, and the like are provided for the operating unit 308.

The start key in the operating unit 308 is used when the reading operation of the original image is started or the like. LEDs of two colors of green and red are provided in a center portion of the start key and whether or not the start key is available is shown by the color. The stop key in the operating unit 308 functions so as to stop the operation which is being executed. The ID key in the operating unit 308 is used when the user ID of the user is input. The reset key is used when the setting from the operating unit is initialized.

By control from the CPU 301, the card reader 319 reads information stored in the IC card (for example, Felica (registered trademark) of Sony Corporation) and notifies the CPU 301 of the read information through the external I/F 318.

Figure 4:
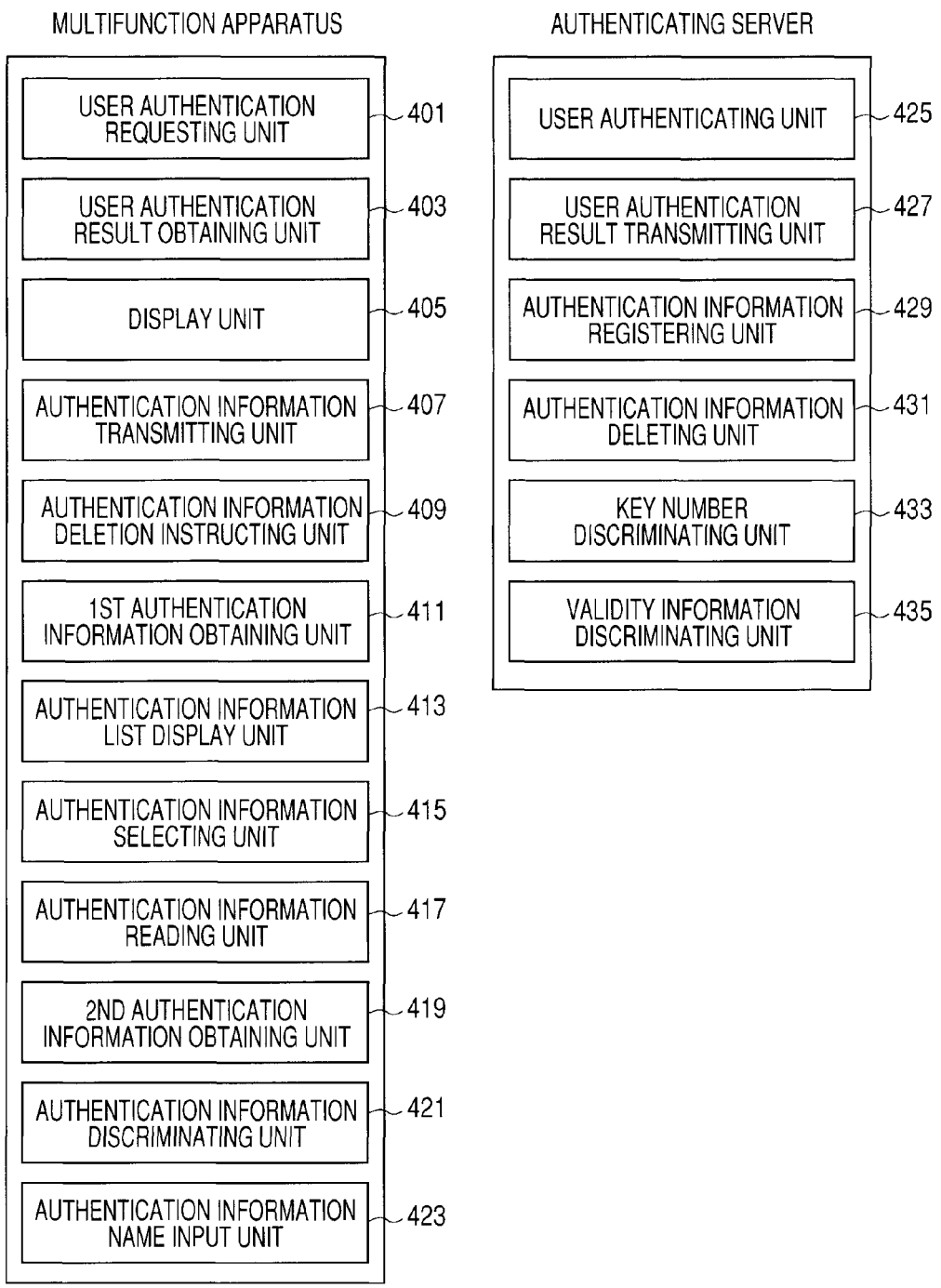
FIG. 4 is a functional block diagram of the multifunction apparatus 100 and an authenticating server 600 (IC card authenticating server 200, directory service server 300).

Subsequently, a functional block diagram of the multifunction apparatus 100 serving as an image forming apparatus of the invention and an authenticating server 600 (IC card authenticating server 200, directory service server 300) shown in FIG. 4 will be described. Detailed control which is processed by each functional block will be described with reference to flowcharts, which will be described hereinafter.

A user authentication requesting unit 401 of the multifunction apparatus 100 obtains a user name, a password, and user information of a user authentication (confirmation) destination which were input by the operation of the user by the operating unit 308. The user authentication requesting unit 401 also transmits the obtained user information as an authenticating request to the authenticating server 600 through the network interface 305. The user authentication requesting unit 401 corresponds to processes of steps S601 and S602, which will be described hereinafter.

A user authenticating unit 425 of the authenticating server 600 searches an IC card authenticating table (illustrated in FIG. 5, which will be described hereinafter) according to the user information received from the multifunction apparatus 100 through the communication I/F controller 208 and discriminates whether or not the user name included in the received user information exists. The user authenticating unit 425 corresponds to processes of steps S603 and S604 and S801 to S807, which will be described hereinafter.

A user authentication result transmitting unit 427 of the authenticating server 600 transmits an authentication result determined by the user authenticating unit 425 to the multifunction apparatus 100. The user authentication result transmitting unit 427 corresponds to a process of step S605, which will be described hereinafter.

A user authentication result obtaining unit 403 of the multifunction apparatus 100 obtains the authentication result from the authenticating server 600. When the authentication result showing authentication OK is obtained, the display screen is shifted to a display screen (illustrated in FIG. 10, which will be described hereinafter) for executing a registration or deletion of the card information of the IC card or a change in password of the user. The user authentication result obtaining unit 403 corresponds to processes of steps S606 and S607, which will be described hereinafter.

A display unit 405 of the multifunction apparatus 100 displays a display screen (illustrated in FIG. 10, which will be described hereinafter) to switch modes for updating the information to the operating unit 308 of the multifunction apparatus 100. Specifically speaking, the operating mode can be switched to a mode for registering the card information, a mode for deleting the card information, and a mode for changing the password of the user information on the display screen. The display unit 405 corresponds to processes of steps S608 and S901 to S906, which will be described hereinafter.

An authentication information transmitting unit 407 of the multifunction apparatus 100 transmits the card information of the IC card obtained by a second authentication information obtaining unit 419 so as to be registered by the authenticating server 600. The authentication information transmitting unit 407 corresponds to a process of step S1103, which will be described hereinafter.

An authentication information deletion instructing unit 409 of the multifunction apparatus 100 instructs the authenticating server 600 to delete one or a plurality of card information of the users authenticated by the user authenticating unit 425. The authentication information deletion instructing unit 409 corresponds to a process of step S1408, which will be described hereinafter.

A first authentication information obtaining unit 411 of the multifunction apparatus 100 obtains all of the card information of the users which have been authenticated by the user authenticating unit 425. The first authentication information obtaining unit 411 corresponds to a process of step S1405, which will be described hereinafter.

An authentication information list display unit 413 of the multifunction apparatus 100 displays a list of the card information obtained by the first authentication information obtaining unit 411. The authentication information list display unit 413 corresponds to a process of step S1406, which will be described hereinafter.

An authentication information selecting unit 415 of the multifunction apparatus 100 enables the user to select the card information whose deletion is instructed by the authentication information deletion instructing unit 409 from the card information list displayed by the authentication information list display unit 413. The authentication information selecting unit 415 corresponds to a process of step S1407, which will be described hereinafter.

An authentication information reading unit 417 of the multifunction apparatus 100 reads the card information of the IC card put over the card reader 319 or the like by the user in order to executes the registering process, the deleting process, or the like of the card information.

The second authentication information obtaining unit 419 of the multifunction apparatus 100 obtains the card information (for example, card number or the like) read by the authentication information reading unit 417 such as a card reader 319 or the like. The obtained card information is sent to the authentication information transmitting unit 407, an authentication information discriminating unit 421, or the like. When the card information is obtained, a notifying display screen (illustrated in FIG. 12 or 16, which will be described hereinafter) is displayed and notified to the user so as to put the IC card over the card reader 319. The authentication information reading unit 417 and the second authentication information obtaining unit 419 correspond to processes of steps S1101 and S1407, which will be described hereinafter.

The authentication information discriminating unit 421 of the multifunction apparatus 100 discriminates whether or not the card information selected in the authentication information selecting unit 415 by the user and the card information obtained in the second authentication information obtaining unit 419 coincide. If they coincide, the card information selected in the authentication information selecting unit 415 by the user is set to a deletion target and the authentication information deletion instructing unit 409 instructs the authenticating server 600 to delete. The authentication information discriminating unit 421 corresponds to the process of step S1407, which will be described hereinafter. An authentication information name input unit 423 corresponds to FIG. 13 and receives the input of the card name by the user on a display screen of FIG. 13.

In the embodiment, when the card information is deleted, first, all card information of the user authenticated by the user authenticating unit 425 is obtained by the first authentication information obtaining unit 411. The obtained list of the card information is displayed by the authentication information list display unit 413. The authentication information selecting unit 415 allows the user to select the card information to be deleted from the list. Subsequently, the authentication information reading unit 417 allows the user to read the IC card corresponding to the card information to be deleted. The second authentication information obtaining unit 419 obtains the read card information. Further, the authentication information discriminating unit 421 compares the card information selected in the authentication information selecting unit 415 by the user with the card information obtained in the second authentication information obtaining unit 419. If the card information coincides, the authentication information deletion instructing unit 409 transmits the coincident card information to the IC card authenticating server 200, thereby allowing the card information to be deleted from the IC card authenticating table (illustrated in FIG. 5, which will be described hereinafter). In the embodiment, although it is constructed in such a manner that the card information is deleted by putting the IC card over the card reader, the card information can be also deleted without putting the IC card over the card reader.

An authentication information registering unit 429 of the authenticating server 600 executes the registering process of the card information into the IC card authenticating table (illustrated in FIG. 5, which will be described hereinafter) in response to a registering command received from the multifunction apparatus 100. The authentication information registering unit 429 corresponds to processes of steps S1104 to S1113.

An authentication information deleting unit 431 of the authenticating server 600 executes the deleting process of the card information from the IC card authenticating table (illustrated in FIG. 5, which will be described hereinafter) in response to a deleting command received from the multifunction apparatus 100. The authentication information deleting unit 431 corresponds to processes of steps S1409 to S1411, which will be described hereinafter.

A key number discriminating unit 433 of the authenticating server 600 discriminates whether or not the card information of the card to be registered has already been included in the card information of the user at the time of the registering process in the authentication information registering unit 429 by comparing a card number (key number).

If it is determined by the key number discriminating unit 433 that the card information of the card of the same card number as the card number of the card to be registered is included in the card information of the user, a validity information discriminating unit 435 compares validity information of the card to be registered with validity information of the card of the same card number as that of the card to be registered in the card information of the user, thereby discriminating whether or not they coincide. Processes of the key number discriminating unit 433 and the validity information discriminating unit 435 correspond to processes of steps S1106, S1107, and S1110, which will be described hereinafter.

Figure 5:
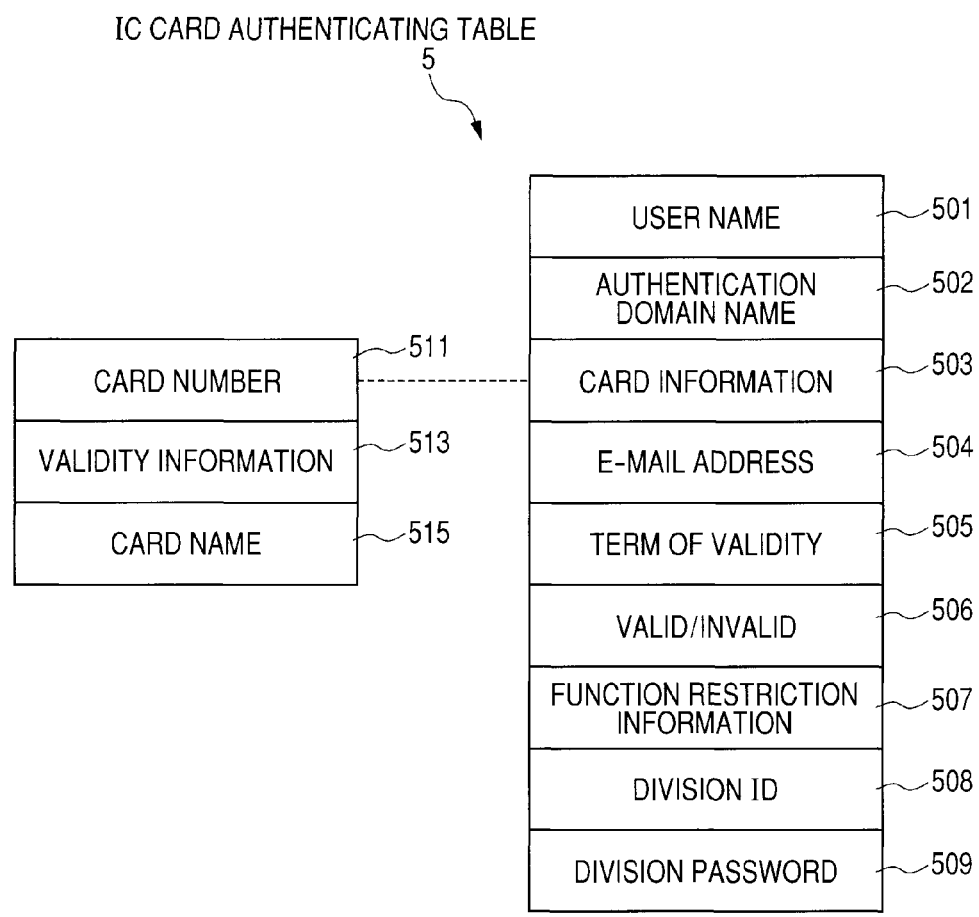
FIG. 5 is a data constructional diagram illustrating an example of a table 5 for authenticating an IC card in the authentication information managing system 1 of the invention.

The IC card authenticating table which is used for a use permission of the multifunction apparatus 100 and a user authentication will be described here with reference to FIG. 5. FIG. 5 is a data constructional diagram illustrating an example of a table 5 for authenticating the IC card in the authentication information managing system 1 of the invention.

As illustrated in FIG. 5, the IC card authenticating table 5 is constructed by information such as user name 501, authentication domain name 502, card information 503, E-mail address 504, term of validity 505, valid/invalid 506, function restriction information 507, division ID 508, division password 509, and the like. The card information 503 includes a card number 511, validity information 513, and a card name 515. A plurality of card information can be registered for one user.

The user name 501 is a name of the user who uses the multifunction apparatus 100. The authentication domain name 502 shows a location where the server of the authentication destination exists on the network. The authentication destination is the IC card authenticating server 200, the directory service server 300, or the like.

The card information 503 is the card information of the IC card for allowing the user to use the multifunction apparatus 100. In the embodiment, the card information 503 of the IC card is, that is, the authentication information for permitting use of the multifunction apparatus 100 (image forming apparatus). The card information 503 includes the card number 511, validity information 513, and card name 515. The card number 511 is a train of numerals or characters for identifying each card. The validity information 513 and the card name 515 will be described hereinafter.

The E-mail address 504 is an E-mail address which the user possesses and is used when a notification regarding use of the multifunction apparatus 100 is transmitted from the multifunction apparatus 100 to the user, or the like.

The term of validity 505 is a term of validity (which has been predetermined for the user) of use of the multifunction apparatus 100. When the term of validity has expired, the user cannot use the multifunction apparatus 100.

The valid/invalid 506 is information showing whether or not the user can use the multifunction apparatus 100. If the use of the multifunction apparatus 100 is not permitted, information showing invalidity is written.

The function restriction information 507 shows the contents of restriction (which has been preset for the user) regarding the use of the multifunction apparatus 100. For example, the contents of the function restriction are expressed by a numeral train of four digits. It is assumed that the first digit indicates the restriction contents regarding use of a copying function, the second digit indicates the restriction contents regarding use of a printer function, the third digit indicates the restriction contents regarding use of a scanner function, and the fourth digit indicates the restriction contents regarding use of a FAX function, respectively. With respect to each digit, it is assumed that 0=cannot be used, 1=can be used, or the like. At this time, in the case of the user who can use only the copying function and the FAX function, the function restriction information is set to "1001".

The division ID 508 is an ID showing a division in the company to which the user belongs. The division password 509 is a password associated with the division ID 508.

In the embodiment, among the items in the IC card authenticating table 5, the administrator preliminarily registers the items other than the card information 503 or registers them at the time of the user management.

An outline regarding the validity information 513 and the card name 515 in the card information 503 will be described hereinbelow. The validity information 513 in the card information 503 is information of numerical values registered in the IC card. For example, when the IC card is lost, this information is used to distinguish the lost IC card from an IC card which has been issued again. By adding a value "1" from the validity information of the lost IC card and issuing the IC card again, the IC card can be distinguished from the lost IC card. The misuse of the lost IC card can be prevented and the security can be held.

When the card number of the IC card is displayed by a card information deletion display screen (illustrated in FIG. 15, which will be described hereinafter) or the like, the card name 515 is displayed together with it, thereby enabling the user to easily discriminate. The card name can be set by a card registration/card name input display screen (illustrated in FIG. 13, which will be described hereinafter) at the time of registering the card information.

A description at the time of the user information managing process, card information registration, card information deletion, and password change in the authentication information managing system 1 of the embodiment will be made with reference to flowcharts of FIGS. 6 to 18 and the drawings.

Figure 6:
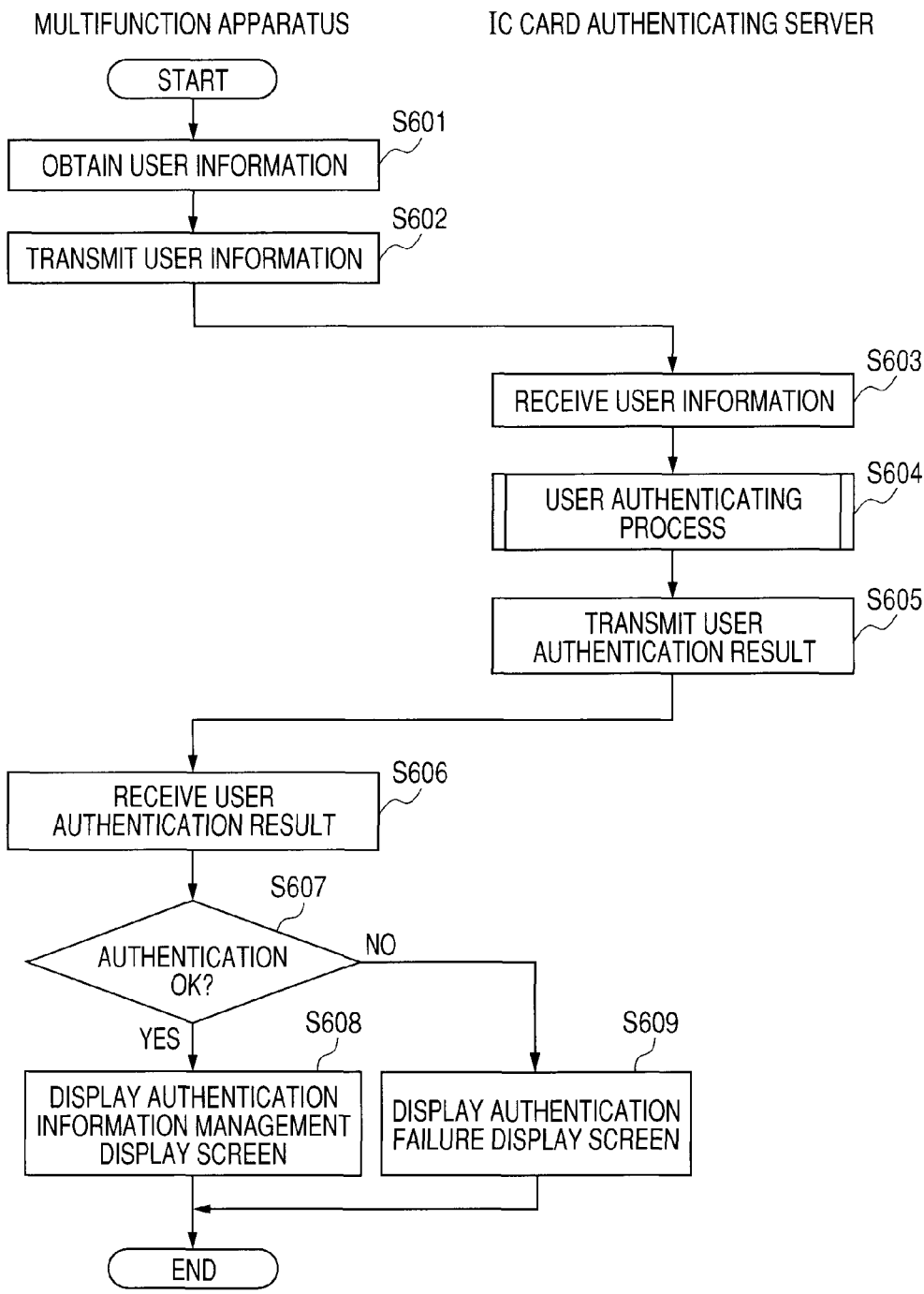
FIG. 6 is a flowchart illustrating an example of a user information managing process in the authentication information managing system 1 of the invention.

First, the user information managing process in the authentication information managing system 1 of the embodiment will be described with reference to FIG. 6. FIG. 6 is a flowchart illustrating an example of the user information managing process in the authentication information managing system 1 of the invention.

The above process is executed in the multifunction apparatus 100 and the IC card authenticating server 200. First, when the user presses a "user information management" button (not shown) provided for the multifunction apparatus 100, a user authentication display screen is displayed.

Figure 7:
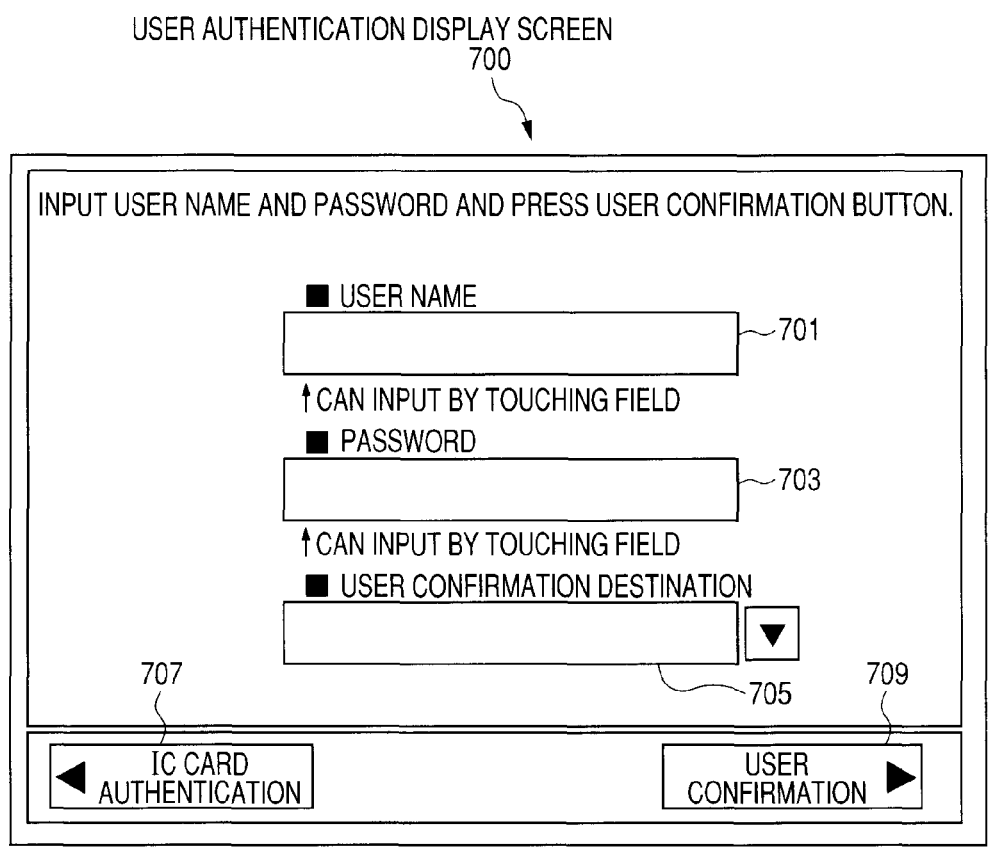
FIG. 7 is a diagram illustrating a user authentication display screen 700 in the authentication information managing system 1 of the invention.

FIG. 7 is a diagram illustrating a user authentication display screen 700 in the authentication information managing system 1 of the invention. The user authentication display screen 700 has a user name input unit 701, a password input unit 703, a user confirmation destination selecting unit 705, an IC card authentication button 707, and a user confirmation button 709. A message for allowing the user to input user information is also displayed. For example, "Input user name and password and press user confirmation button." is displayed.

The user name input unit 701 is used to input the user name. The password input unit 703 is used to input the password corresponding to the user name. The user confirmation destination selecting unit 705 is used to select a server which is subjected to a user authentication. As a user confirmation destination, the IC card authenticating server 200, directory service server 300, or the like exists. The IC card authentication button 707 is used to display a display screen (not shown) for allowing the user to put the IC card at the time of the printing process. The user confirmation button 709 is used to transmit the input contents to the server which is subjected to the user authentication.

In step S601, the user name, password, and user authentication destination which were input by the user operation on the user authentication display screen are obtained. As a user authentication destination, the IC card authenticating server 200 or the directory service server 300 such as Active Directory (registered trademark) of Windows (registered trademark), LDAP server, or the like exists.

The obtained user name, password, and user authentication destination are stored into the RAM 302 and are used in processes of steps S1103 and S1401, which will be described hereinafter.

In step S602, the multifunction apparatus 100 transmits the user name, password, and user authentication destination obtained in step S601 to the IC card authenticating server 200 according to the user operation. In step S603, the IC card authenticating server 200 receives the user name, password, and user authentication destination.

In step S604, the IC card authenticating server 200 executes the user authenticating process based on the information received in step S603. The user authenticating process will be described later with reference to the flowchart of FIG. 8.

Although the invention has been constructed in such a manner that after the user pressed the "user information management" button (not shown), the user name, password, and user authentication destination are input and the registering process or the deleting process, which will be described hereinafter, is executed, the invention is not limited to it. For example, it is also possible to construct in such a manner that the IC card is put over the card reader provided for the multifunction apparatus 100, the card number included in the IC card is transmitted to the IC card authenticating server 200, and if it is authenticated, the registering process or the deleting process, which will be described hereinafter, is executed. Since the user can arbitrarily store information other than a manufacturing number of the card into the IC card, for example, a staff identification number or the like allocated in the company has been embedded. In this case, the authenticating process can be also executed by using the staff identification number (user information).

In step S605, the IC card authenticating server 200 transmits a user authentication result (authentication OK or NG) of step S604 to the multifunction apparatus 100. The multifunction apparatus 100 receives the user authentication result in step S606.

In step S607, the multifunction apparatus 100 discriminates the user authentication result received in step S606.

If the authentication is OK, the multifunction apparatus 100 displays an authentication information management display screen (illustrated in FIG. 10, which will be described hereinafter) (step S608). If the authentication is NG, the multifunction apparatus 100 displays an authentication failure display screen (not shown) (step S609).

Figure 8:
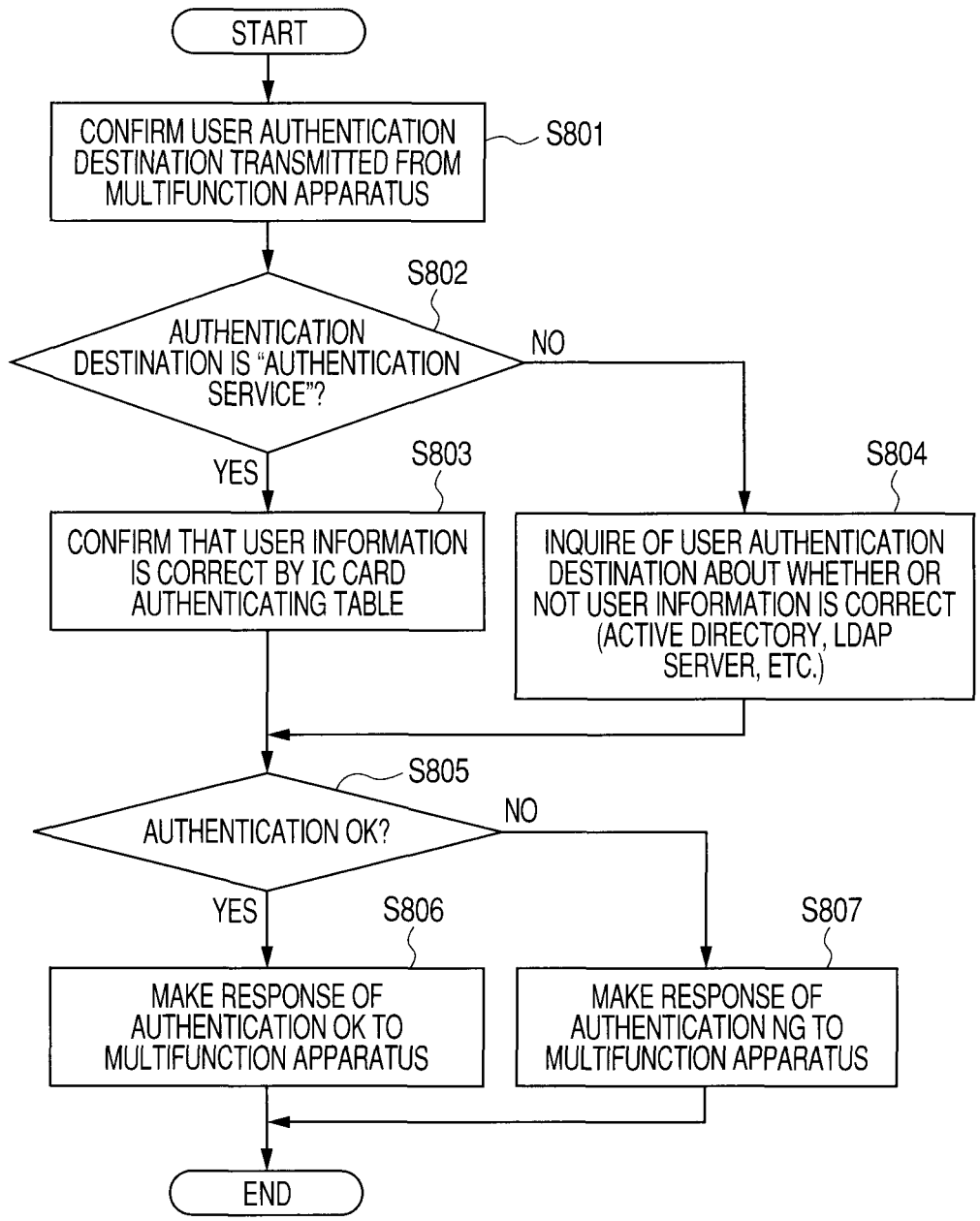
FIG. 8 is a flowchart illustrating an example of a user authenticating process of the IC card authenticating server 200 in the authentication information managing system 1 of the invention.

The user authenticating process of the IC card authenticating server 200 in the authentication information managing system 1 of the embodiment will be described with reference to FIG. 8. FIG. 8 is a flowchart illustrating an example of the user authenticating process of the IC card authenticating server 200 in the authentication information managing system 1 of the invention.

In step S801, the IC card authenticating server 200 obtains the user authentication destination from the user name, password, and user authentication destination received in step S603 mentioned above and confirms. In the embodiment, there are a case where the user authentication destination is "authentication service" and a case where it is other than "authentication service" (step S802).

If the user authentication destination is "authentication service", the IC card authenticating server 200 executes the authenticating process to the user information which is managed in the IC card authenticating table 5 (step S803). In the other cases, the authenticating process is executed to the designated authentication destination such as Active Directory (registered trademark) of Windows (registered trademark), LDAP server (directory service server 300), or the like (step S804).

In the authenticating process, whether or not the user information is correct, that is, whether or not the user name included in the user information exists in the authentication table which the authentication destination has is confirmed.

In step S805, the IC card authenticating server 200 obtains a result of the user authenticating process executed in step S803 or step S804, that is, a result about whether or not the user information is correct (whether or not the user name exists) and discriminates the authentication result.

If the user information is correct, a response showing the authentication OK is made to the multifunction apparatus 100 (step S806). If the user information is incorrect, a response showing the authentication NG is made to the multifunction apparatus 100 (step S807).

Figure 9:
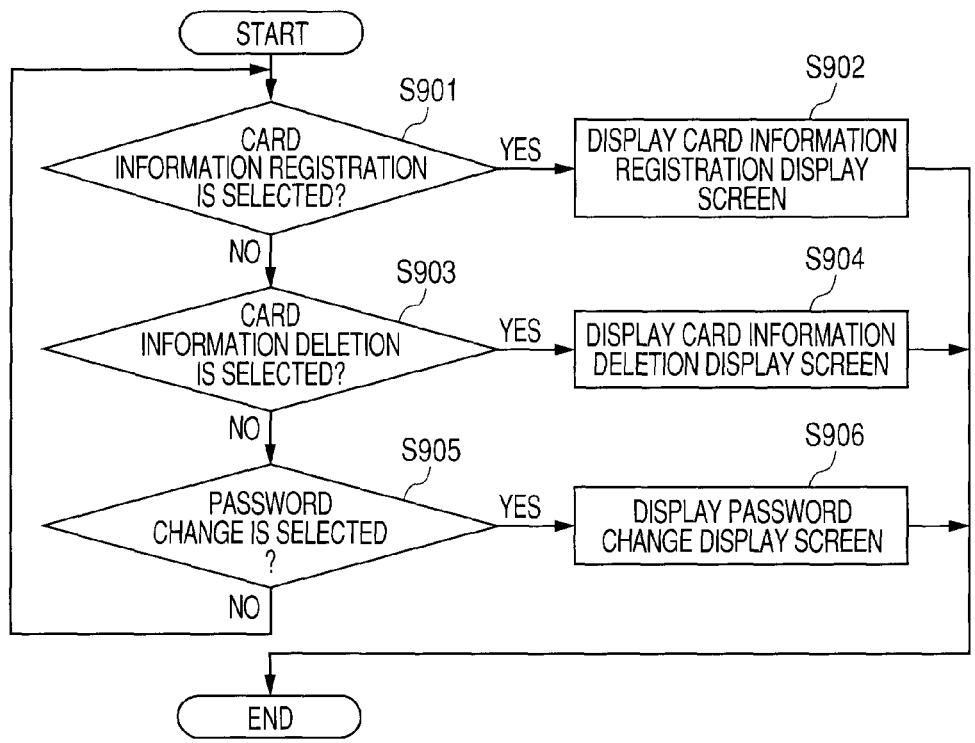
FIG. 9 is a flowchart illustrating an example of a control procedure on an authentication information management display screen of the multifunction apparatus 100 in the authentication information managing system 1 of the invention.

Control on the authentication information management display screen of the multifunction apparatus 100 in the authentication information managing system 1 of the embodiment will be described with reference to FIG. 9. FIG. 9 is a flowchart illustrating an example of a control procedure on the authentication information management display screen of the multifunction apparatus 100 in the authentication information managing system 1 of the invention.

Figure 10:
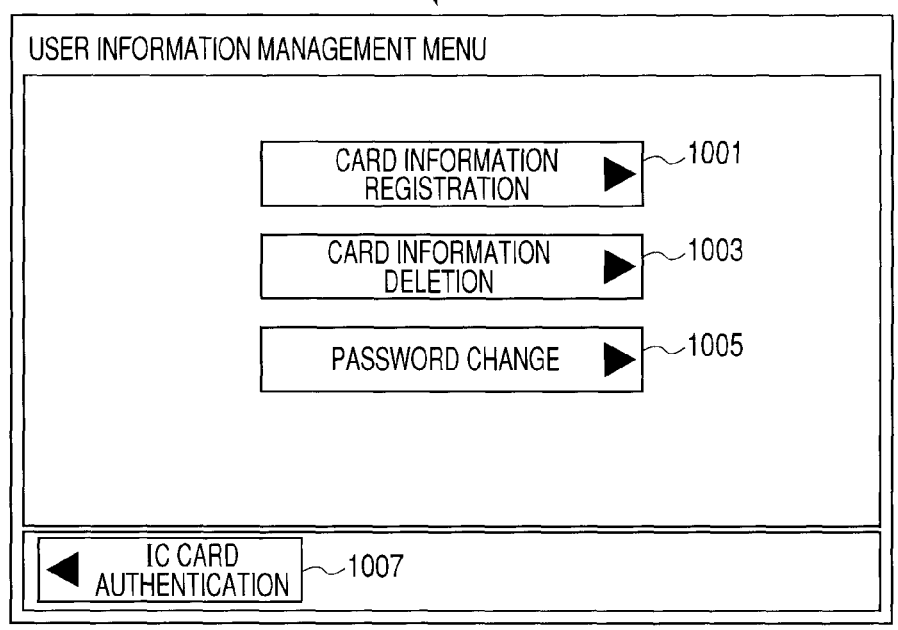
FIG. 10 is a diagram illustrating an authentication information management display screen 1010 in the authentication information managing system 1 of the invention.

When the multifunction apparatus 100 receives the authentication result of the authentication OK from the IC card authenticating server 200 in step S606, the multifunction apparatus 100 displays an authentication information management display screen 1010 in step S608 and executes the control illustrated in the flowchart of FIG. 9. FIG. 10 is a diagram illustrating the authentication information management display screen 1010 which is displayed in step S608 in the authentication information managing system 1 of the invention.

The authentication information management display screen 1010 illustrated in FIG. 10 has a card information registration button 1001, a card information deletion button 1003, a password change button 1005, and an IC card authentication button 1007. The card information registration button 1001 is a button to shift to the process of the card information registration. The card information deletion button 1003 is a button to shift to the process of the card information deletion. The password change button 1005 is a button to shift to the process of the password change. The IC card authentication button 1007 is a button to display a display screen (not shown) for allowing the user to put the IC card at the time of the printing process.

In step S901, the multifunction apparatus 100 discriminates whether or not the card information registration 1001 has been selected by the user operation on the authentication information management display screen 1010 illustrated in FIG. 10. If the card information registration 1001 has been selected, an operating mode is set to a registering mode. If the card information registration 1001 has been selected, a card information registration display screen (illustrated in FIG. 12, which will be described hereinafter) is displayed in step S902.

In step S903, the multifunction apparatus 100 discriminates whether or not the card information deletion 1003 has been selected by the user operation on the authentication information management display screen 1010 illustrated in FIG. 10. If the card information deletion 1003 has been selected, the operating mode is set to a deleting mode. If the card information deletion 1003 has been selected, a card information deletion display screen (illustrated in FIG. 15, which will be described hereinafter) is displayed in step S904.

In step S905, the multifunction apparatus 100 discriminates whether or not the password change 1005 has been selected by the user operation on the authentication information management display screen 1010 illustrated in FIG. 10. If the password change 1005 has been selected, the operating mode is set to a password changing mode. If the password change 1005 has been selected, a password change display screen (illustrated in FIG. 18, which will be described hereinafter) is displayed in step S906.

The processes of the card information registration, card information deletion, and password change, which will be described hereinafter, will be described on the assumption that the processes of the registration, deletion, and change are executed to the IC card authenticating table 5 provided for the IC card authenticating server 200. However, in the case where the card information has been managed by Active Directory (registered trademark) of Windows (registered trademark), the directory service server 300 such as an LDAP server, or the like, the processes of the registration, deletion, and change can be also executed to the information of Active Directory (registered trademark) of Windows (registered trademark) or the LDAP server according to the user authentication destination. In such a case, they may be executed through the IC card authenticating server 200 or can be also executed without intervening the IC card authenticating server 200.

That is, the IC card authenticating server 200, the directory service server 300 (Active Directory (registered trademark) of Windows (registered trademark), the LDAP server, and the like) are constructed in the same casing and can be considered as one authenticating server 600. With respect to a construction of the authenticating server 600, it can be arbitrarily constructed by the operation of the user.

Figure 11:
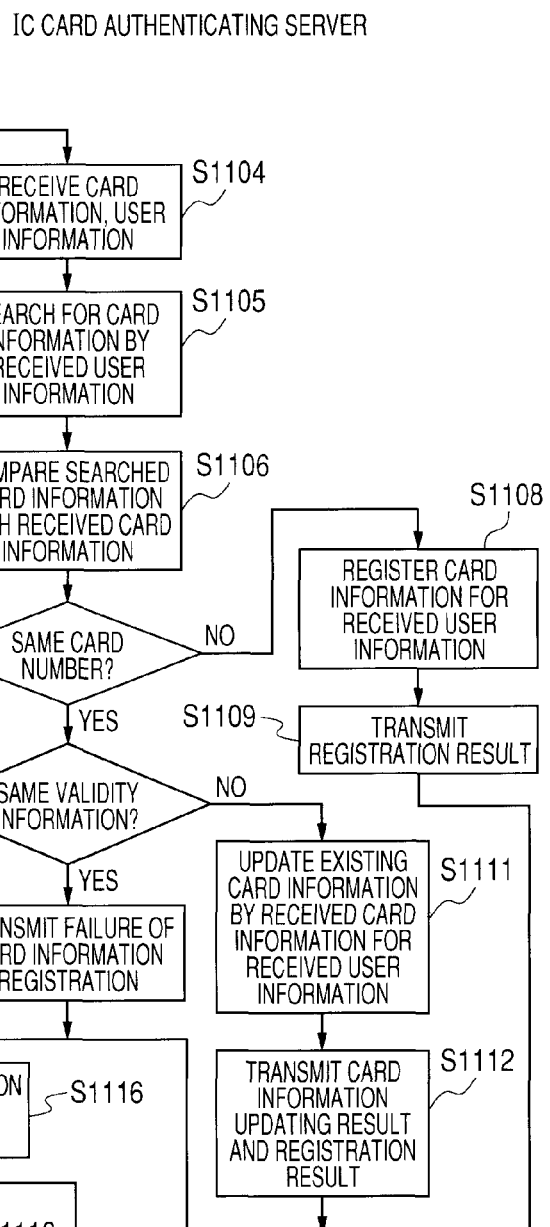
FIG. 11 is a flowchart illustrating an example of a control procedure at the time of registering card information in the authentication information managing system 1 of the invention.

Processes when the card information registration display screen is displayed in step S902 in the authentication information managing system 1 of the embodiment will be described with reference to FIG. 11. FIG. 11 is a flowchart illustrating an example of control procedure at the time of registering the card information in the authentication information managing system 1 of the invention.

If the card information registration has been selected in step S901 mentioned above, the card information registration display screen is displayed in step S902. FIG. 12 is a diagram illustrating a card information reading display screen 1200 at the time of registering the card information in the authentication information managing system 1 of the invention. A message for allowing the user to put the IC card which is registered over the card reader 319 is displayed on the card information reading display screen 1200. For example, a message such as "Card information is registered into authentication service. Touch card which is registered to card reader." is displayed. The card information reading display screen 1200 has a back button 1201 for displaying a previous display screen and an OK button 1203 for deciding the card information of the IC card which has been put.

In step S1101, when the IC card has been put over the card reader 319 by the user operation in response to an instruction on the card information reading display screen 1200, the multifunction apparatus 100 obtains the card number and the validity information read out of the card reader 319.

In step S1102, the multifunction apparatus 100 displays a card registration/card name input display screen for registering the card name for the card number and the validity information read out in step S1101.

FIG. 13 is a diagram illustrating a card registration/card name input display screen 1300 in the authentication information managing system 1 of the invention. The card registration/card name input display screen 1300 displays the message for registering the card information of the IC card obtained in step S1101 and the card information (card number). As a message which is displayed, for example, there is "Card information is registered into authentication service. Press "OK" button if you want.". The card registration/card name input display screen 1300 also has a card name (authentication information name) input unit 1301 for registering an arbitrary name into the IC card. The card name is used for the user to discriminate the IC card. In addition, the display screen 1300 has a back button 1303 for displaying a previous display screen and an OK button 1305 for deciding the registration contents and transmitting to the IC card authenticating server 200.

In step S1103, the multifunction apparatus 100 transmits the card information (card number, validity information, card name) which has been obtained in step S1101 and input in step S1102 and the user information (user name, user authentication destination) obtained in step S601 to the IC card authenticating server 200 according to the user operation.

In step S1104, the IC card authenticating server 200 receives the card information and the user information transmitted in step S1103.

In step S1105, the IC card authenticating server 200 searches the IC card authenticating table 5 for the card information associated with the user information received in step S1104.

In step S1106, the IC card authenticating server 200 compares the card information received in step S1104 with the card information searched for in step S1105.

If the card information of the same card number as the card number of the card information received in step S1104 exists in the card information searched for in step S1105 in step S1107 as a result of the comparison executed in step S1106, the IC card authenticating server 200 executes a process of step S1110. If the card information of the same card number does not exist, since new card information is added, a process of step S1108 is executed.

In step S1108, the IC card authenticating server 200 registers the card information received in step S1104 for the relevant user in the IC card authenticating table 5.

If the relevant user does not exist in the IC card authenticating table 5 (that is, a case where the user exists in Active Directory (registered trademark) of Windows (registered trademark) or the directory service server 300 such as an LDAP server or the like), the user name and the card information can be also registered into the IC card authenticating table 5.

Subsequently, in step S1109, a registration result (registration OK) is transmitted to the multifunction apparatus 100.

On the other hand, if the card information of the same card number as the card number of the card information received in step S1104 exists in the card information searched for in step S1105 from the result of the comparison executed in step S1106, a discrimination result of step S1107 is YES and the processing routine advances to step S1110. In step S1110, the IC card authenticating server 200 decides that the validity information is also identical with respect to the card information of the same card number from the result of the comparison executed in step S1106, since the card information of the same IC card has already been registered, a notification showing a card information registration failure (registration NG) is transmitted to the multifunction apparatus 100 in step S1113.

If it is determined that the validity information differs with respect to the card information of the same card number, it is decided that the card information is updated. An updating process of the card information (updating of the validity information, updating of the card name) is executed in step S1111 and the existing card information (of the same card number) is updated by the card information received in step S1104. After that, a card information updating result and the registration result (registration OK) are transmitted to the multifunction apparatus 100 in step S1112. However, even in the case where the validity information differs with respect to the card information of the same card number, if a numerical value of the validity information of the card information received in step S1104 is smaller, it is decided that such a card is a card before the IC card is issued again. Therefore, the updating of the card information is not executed but a notification showing registration NG is transmitted to the multifunction apparatus 100. A case where the card number coincides irrespective of the reissuance of the card although the validity information is information showing the reissuance is a case where, for example, the staff identification number or the like has arbitrarily been input in the card upon operation. In such a case where the staff identification number is similarly used like a card number and the system is operated, although the card number of the IC card which has been issued again due to a reason such as loss or the like coincides with the IC card before the reissuance, the validity information does not coincide. Further, when the card is issued again, since a value "1" is added to the numerical value showing the validity information and the IC card is issued again, the card in which the numerical value showing the validity information is smaller is determined as an IC card before it was lost or the like. Therefore, by the foregoing processes, even if the user tries to register the card before it was lost or the like, since the validity information has a small numerical value, the registration is not performed. Consequently, the misuse of the lost IC card can be prevented and the security can be held.

In step S1114, the multifunction apparatus 100 receives the registration results transmitted in step S1109, S1112, or S1113.

In step S1115, the multifunction apparatus 100 discriminates the registration results received in step S1114. When the card information registration failure (registration NG) is received, the processing routine advances to a process of step S1116. The multifunction apparatus 100 displays a card information registration failure display screen (not shown) in step S1116.

When a card information registration success (registration OK) is received, the processing routine advances to a process of step S1117. In step S1117, the multifunction apparatus 100 discriminates whether or not the card information updating result has been received in step S1114. If the card information has been updated, a card information updating success display screen (not shown) is displayed (step S1119). If the card information is not updated, since the new card information has successfully been registered, a card information registration success display screen (not shown) is displayed (step S1118).

Figure 14:
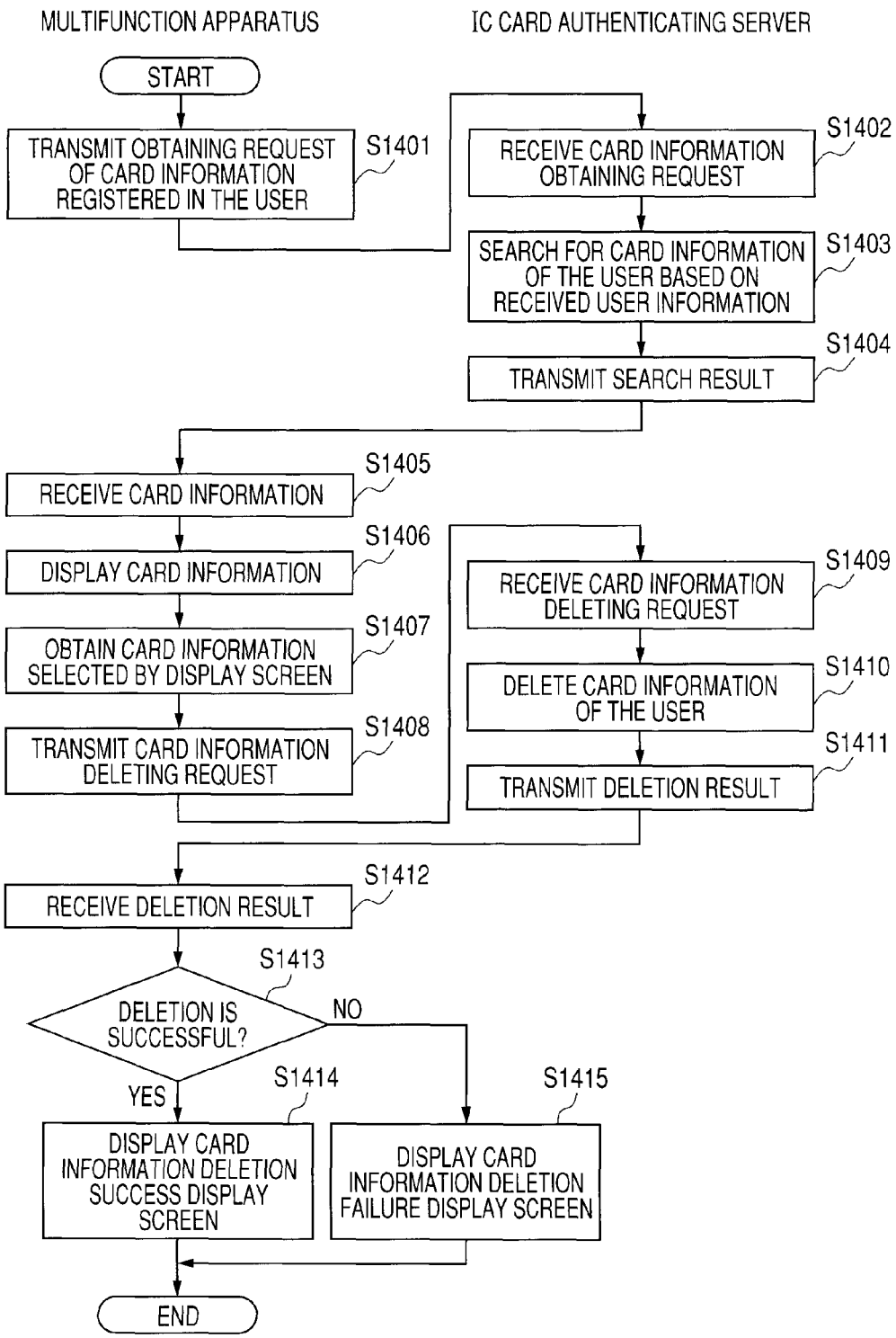
FIG. 14 is a flowchart illustrating an example of a control procedure at the time of deleting the card information in the authentication information managing system 1 of the invention.

Subsequently, processes at the time when the card information deletion has been selected in step S903 in the authentication information managing system 1 of the embodiment will be described with reference to FIG. 14. FIG. 14 is a flowchart illustrating an example of a control procedure at the time of deleting the card information in the authentication information managing system 1 of the invention.

When the card information deletion has been selected in step S903 mentioned above, the multifunction apparatus 100 transmits an obtaining request of the card information held by the user to the IC card authenticating server 200 in step S1401. At this time, the user information (user name, user authentication destination) obtained in step S601 is transmitted.

Although the invention has been constructed in such a manner that the display screen of FIG. 15 is displayed and the selected card information is deleted as will be described hereinafter, the invention can be also constructed in such a manner that after the button of the card information deletion 1003 in FIG. 10 was pressed, the IC card is put over the card reader 319, the card number derived from the card reader 319 is transmitted to the IC card authenticating server 200, and the card information (card number, card name, etc.) is deleted in the IC card authenticating server 200.

Since there is a case where such an operation that one user possesses the personal IC card and an IC card common to the division is executed, it is also possible to construct in such a manner that in order to delete the card information (card number, card name, etc.) of the specific user, the user information obtained in step S601 is transmitted to the IC card authenticating server 200.

In the case of the construction in which after the button of the card information deletion 1003 in FIG. 10 was pressed, the IC card is put over the card reader 319, the card number derived from the card reader 319 is transmitted to the IC card authenticating server 200, and the card information (card number, card name, etc.) is deleted in the IC card authenticating server 200 as mentioned above, it is also possible to construct in such a manner that the display screen of FIG. 15 is not displayed but a notification (display of a notification display screen) showing that the card to be deleted is put over the card reader is made.

Further, it is also possible to construct in such a manner that the display screen of FIG. 15 is displayed, when the IC card is put over the card reader, the card information which coincides with the card number of the IC card is automatically selected in 1501 in FIG. 15, and when an OK button 1507 is pressed, the deletion is instructed to the IC card authenticating server 200.

Thus, such a troublesomeness that the user selects the card information on the display screen of FIG. 15, which will be described hereinafter, can be omitted and the card information can be easily deleted. For example, in the case where even if a list was displayed in 1501 in FIG. 15, the user cannot discriminate (has forgot) to which card the card to be deleted corresponds, since the user can delete the card information by putting the IC card over the card reader without selecting the card information, there is particularly an advantage.

The IC card authenticating server 200 receives the obtaining request of the card information in step S1402. Thus, the IC card authenticating server 200 searches for the card information associated with the received user information (user name, user authentication destination) in step S1403.

In step S1404, the IC card authenticating server 200 transmits the card information searched for in step S1403 to the multifunction apparatus 100. The card number, validity information, and card name are included in the card information.

The multifunction apparatus 100 receives the card information in step S1405 and displays a list of the received card information in step S1406.

FIG. 15 is a diagram illustrating a card information deletion display screen 1500 in the authentication information managing system 1 of the invention. The multifunction apparatus 100 displays such a display screen in step S1406. The card information deletion display screen 1500 has: a card information list display unit 1501 for displaying the list of the card information associated with the user information so that it can be selected; an all selection button 1503 for instructing that all of the displayed card information is selected; a back button 1505 for displaying a previous display screen; and the OK button 1507 for deciding the selected card information. A message for allowing the user to select and delete the card information to be deleted from the card information displayed as a list is also displayed. As a message, for example, "Card information registered in authentication service is deleted. Select card information to be deleted. Press "OK" button if you want." is displayed.

Although the invention has been constructed in such a manner that the list of the card information associated with the user information is displayed on the card information list display unit 1501 on the card information deletion display screen 1500 so that it can be selected, and the deletion of the selected card information is instructed by pressing the OK button 1507 as illustrated in FIG. 15, the invention is not limited to it. For example, it is also possible to construct in such a manner that when the list of the card information associated with the user information is displayed on the card information list display unit 1501, it is not displayed so that it can be selected (the list of the card information is simply displayed). In this case, when the OK button 1507 is pressed, the deletion is instructed to the IC card authenticating server 200 so as to delete all of the card information. Although the invention has been constructed so that the card information of the card name and the card number is displayed on the card information list display unit 1501, it is also possible to construct in such a manner that either the card name or the card number is displayed.

In step S1407, when the selection of the card information to be deleted from the card information displayed as a list is executed by the user operation, the multifunction apparatus 100 displays a card information reading display screen 1600 at the time of the card information deletion illustrated in FIG. 16.

FIG. 16 is a diagram illustrating the card information reading display screen 1600 at the time of deleting the card information in the authentication information managing system 1 of the invention. The display screen 1600 is displayed by the multifunction apparatus 100 in step S1407.

The card information reading display screen 1600 has:
a card information display unit 1601 for displaying the card information whose deletion has been selected in step S1407; a back button 1603 for displaying a previous display screen; and an OK button 1605 for deciding the card information to be deleted and transmitting to the IC card authenticating server 200. A message is also displayed so that the IC card corresponding to the displayed card information is put over the card reader 319 and the card information is deleted. As a message, for example, "The following card information registered in authentication service is deleted. Touch the card to card reader." is displayed.

When the IC card is put over the card reader by the user operation, the multifunction apparatus 100 compares the selected card information with the read card information. In the case of the same card number, the card information is recognized as card information as a deletion target.

The operation for selecting the card information displayed as a list and putting the card over the card reader can be executed with respect to one or a plurality of card information. Although it is constructed in such a manner that after the card information was selected on the card information deletion display screen 1500, the IC card is put over the card reader and the card information whose card information coincides is deleted in the embodiment, it is also possible to construct in such a manner that the card information is deleted merely by putting the IC card over the card reader without selecting it. In this case, by transmitting the card information of the IC card read by the card reader 319 to the IC card authenticating server 200, the card information can be deleted. Further, it is also possible to construct in such a manner that the card information is deleted merely by selecting it without putting the IC card over the card reader. In this case, the selected card information is transmitted to the IC card authenticating server 200.

When the card information deletion has been executed by the user operation (in the case where the OK button 1605 has been pressed in FIG. 16), in step S1408, the multifunction apparatus 100 transmits the card information (card number, validity information, card name) designated as a deletion target in step S1407 and the user information (user name, user authentication destination) as a card information deleting request to the IC card authenticating server 200.

The IC card authenticating server 200 receives the card information deleting request in step S1409. Subsequently, in step S1410, the IC card authenticating server 200 deletes the card information as a deletion target in the card information corresponding to the user name included in the card information deleting request from the IC card authenticating table 5.

The IC card authenticating server 200 transmits a card information deletion result (deletion is successful, deletion has failed) to the multifunction apparatus 100 in step S1411.

The multifunction apparatus 100 receives the card information deletion result in step S1412. Subsequently, the multifunction apparatus 100 discriminates the card information deletion result in step S1413. If the deletion is successful, a card information deletion success display screen (not shown) is displayed (step S1414). If the deletion has failed due to a system malfunction or the like, a card information deletion failure display screen (not shown) is displayed (step S1415).

Subsequently, processes at the time when a password change display screen has been displayed in step S906 in the authentication information managing system 1 of the embodiment will be described with reference to FIG. 17. FIG. 17 is a flowchart illustrating an example of a control procedure at the time of changing a password in the authentication information managing system 1 of the invention.

Figure 18:
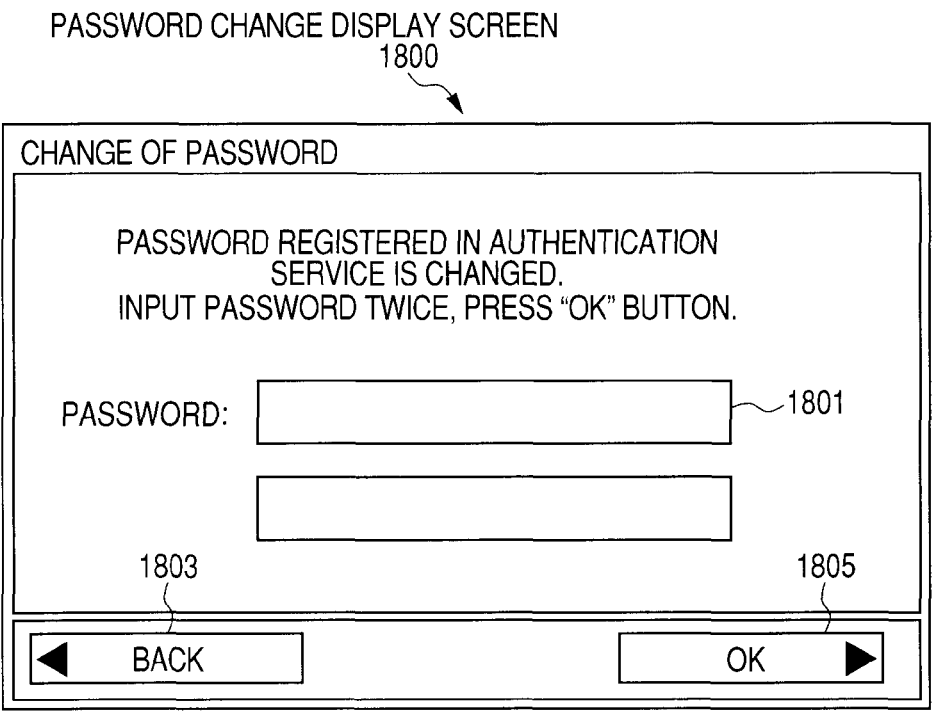
FIG. 18 is a diagram illustrating a password change display screen 1800 in the authentication information managing system 1 of the invention.

When the password change has been selected in step S905 mentioned before, a password change display screen illustrated in FIG. 18 is displayed in step S906. FIG. 18 is a diagram illustrating a password change display screen 1800 in the authentication information managing system 1 of the invention.

The password change display screen 1800 has: a password input unit 1801 for inputting a password; a back button 1803 for returning to a previous display screen; and an OK button 1805 for deciding the input contents and transmitting to the IC card authenticating server 200. Two input columns are provided for the password input unit 1801 and the input password can be confirmed and input. A message is displayed so as to change the password. As a message, for example, "Password registered in authentication service is changed. Input password twice, press "OK" button." is displayed.

The multifunction apparatus 100 obtains a new password input by the user operation through the password change display screen 1800 in step S1701.

Subsequently, in step S1702, the multifunction apparatus 100 transmits the new password obtained in step S1701 and the user information (user name, user authentication destination) obtained in step S601 to the IC card authenticating server 200.

In step S1703, the IC card authenticating server 200 receives the new password and the user information (user name, user authentication destination) transmitted in step S1702.

In step S1704, the IC card authenticating server 200 changes the password of the relevant user in the IC card authenticating table 5 to the new password.

In step S1705, the IC card authenticating server 200 transmits a password change result (change is successful, change has failed) to the multifunction apparatus 100.

The multifunction apparatus 100 receives the password change result in step S1706. The multifunction apparatus 100 discriminates the received password change result in step S1707. If the password change result indicates that the change is successful, a password change success display screen is displayed (step S1708). If the change has failed due to the system malfunction or the like and the password change result indicates the change failure, a password change failure display screen is displayed (step S1709).

As described above, by the embodiment of the invention, the registration, updating, and deletion of a plurality of card information can be easily performed for one user on the image forming apparatus and the invention can cope with the operation cases of various users. Thus, an authentication information managing system of the image forming apparatus which can easily manage a plurality of card information which are registered for one user can be provided.

<Other Embodiments>

First, a prerequisite technique will be described. A print system of what is called "pull-print (storage print)" in which the user issues the print request from the printing apparatus to the print data which has temporarily been stored in the server, thereby outputting the print data from the printing apparatus has been known. Thus, the user can output the print data from a desired printing apparatus instead of outputting to a specific printing apparatus from an application upon printing (the Official Gazette of Japanese Patent Application Laid-Open No. 2006-99714).

An example of a printing procedure in the print system serving as a prerequisite is as follows. When the user puts the IC card over the IC card reader connected to the printing apparatus, the IC card reader detects a UID (unique ID) of the IC card. In order to discriminate whether or not the user is a user who can use, the printing apparatus executes an authenticating process of the user with reference to an authentication table which has been stored in the authenticating server and in which permission or inhibition of log-in based on the UID has been set. If the log-in can be performed as a result of the authenticating process, the printing apparatus obtains and prints the print data of the relevant user which has temporarily been stored in the server. In such a mechanism, if a person who newly uses the printing apparatus, a person who does not use the printing apparatus any more, or the like appeared, since registration of the UID and deletion of the UID are requested to the administrator and the administrator executes them, such a problem that a troublesomeness of the administrator is required occurs.

Therefore, such a mechanism that if the UID is not registered at the time of the IC card authentication, the UID of the IC card is registered into the authenticating table has been disclosed in the Official Gazette of Japanese Patent Application Laid-Open No. 2008-181491. A system of the Official Gazette of Japanese Patent Application Laid-Open No. 2008-181491 is a system in which in the case where the IC card which was newly issued has been put over the card reader and the IC card authentication has been executed, if the card information (UID) of the put IC card is not registered in the authenticating table of the authenticating server, the card information of the IC card is registered. In a company in which the IC card operation is executed, there are many cases where when the IC card is lost or the user forgets to bring the IC card, he uses a temporary lending card (temporary card). Since the temporary card is lent to a different user everyday, if the system of the above Patent Document 2 is used, the temporary card information is associated with the user who has been registered for the first time and such a problem that the user whom the temporary card has been lent next cannot register the card occurs. There is also such a problem that if the card is put as it is, the log-in is performed in the previous user. The above description has been made with respect to the prerequisite technique.

Figure 19:
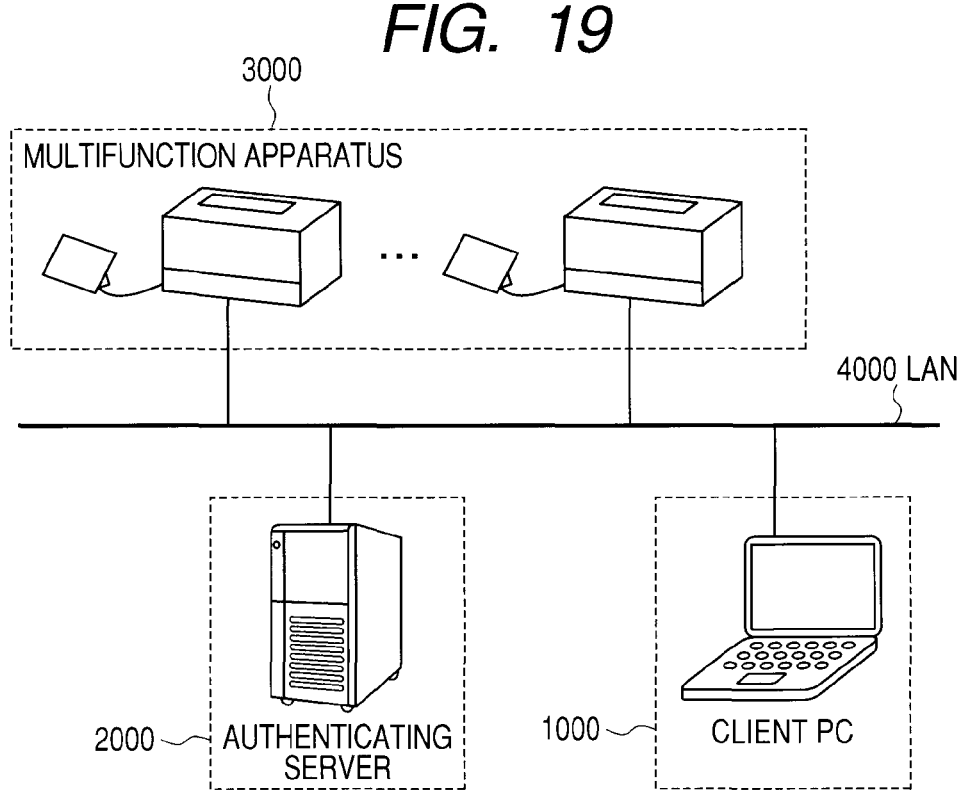
FIG. 19 is a diagram illustrating a construction of an image forming system according to an embodiment of the invention.

An exemplary embodiment of an image forming system according to the invention will be described in detail hereinbelow with reference to the drawings. FIG. 19 is a system constructional diagram illustrating an example of the image forming system (information processing system) of the embodiment. As illustrated in FIG. 19, the image forming system (information processing system) has a construction in which, for example, one or a plurality of multifunction apparatuses 3000, one or two IC card authenticating servers 2000, and one or a plurality of client PCs 1000 are connected through a Local Area Network (LAN) 4000 (communication medium).

The multifunction apparatus 3000 transmits the card number, as an authenticating request, read out of the card put over the card reader 319, which will be described hereinafter, to the IC card authenticating server 2000 and also transmits the user name and the password, as an authenticating request, input by the operating unit 308 of the multifunction apparatus, which will be described hereinafter, to the IC card authenticating server 2000.

An IC card authenticating table (FIG. 40), which will be described hereinafter, has been stored in the IC card authenticating server 2000. The server 2000 executes the authenticating process by using the IC card authenticating table according to the authenticating request by the IC card from the multifunction apparatus 3000 or the authenticating request by the user name and the password. It is also possible to construct in such a manner that the IC card authenticating server 2000 can communicate with, for example, a directory server (not shown), when there is an authenticating request by the user name and the password, the server 2000 inquires of the directory server, if the user name has been stored in the directory server, it is decided that the authentication is successful, and an authentication result is transmitted from the IC card authenticating server 2000 to the multifunction apparatus 3000. That is, the IC card authenticating server 2000 is an apparatus having a function of the directory server. The client PC 1000 makes print setting or the like into the multifunction apparatus 3000.

Subsequently, portions different from those of the foregoing embodiment will be described by using FIG. 2. FIG. 2 is a diagram for describing a hardware construction of the client PC 1000 and the IC card authenticating server 2000 illustrated in FIG. 19. FIG. 2 is a block diagram illustrating an example of the hardware construction of an information processing apparatus which can be applied to the client PC 1000 and the IC card authenticating server 2000.

As illustrated in FIG. 2, the client PC 1000 and the IC card authenticating server 2000 have a construction in which the CPU (Central Processing Unit) 201, RAM (Random Access Memory) 203, ROM (Read Only Memory) 202, input controller 205, video controller 206, memory controller 207, communication I/F controller 208, and the like are connected through the system bus 204.

The CPU 201 integratedly controls each device and controllers which are connected to the system bus 204. The BIOS (Basic Input/Output System) serving as a control program of the CPU 201, the OS (Operating Systems), the various kinds of programs, which will be described hereinafter, necessary for realizing the functions which are executed by each server or each PC, and the like have been stored in the ROM 202 or the external memory 211. The RAM 203 functions as a main memory, a work area, or the like of the CPU 201. The CPU 201 loads the programs or the like necessary for executing the processes in the embodiment, which will be described hereinafter, into the RAM 203 from the ROM 202 or the external memory 211 and executes the loaded programs, thereby realizing the various kinds of operations.

The communication I/F controller 208 is connected to and communicates with an external apparatus through the network (for example, LAN 4000 illustrated in FIG. 19) and executes the communication control process on the network. For example, the communication or the like using the TCP/IP (Transmission Control Protocol/Internet Protocol) can be performed.

The CPU 201 executes, for example, the developing (rasterizing) process of the outline font into the area for the display information in the RAM 203, thereby enabling the data to be displayed on the CRT 210. The CPU 201 also enables the user to instruct by using the mouse cursor or the like (not shown) on the CRT 210.

Subsequently, portions different from the foregoing embodiment will be described by using FIG. 3. A hardware construction of the controller unit for controlling the multifunction apparatus 3000 as an information processing apparatus of the invention will be described. FIG. 3 is a block diagram illustrating an example of a hardware construction of the controller unit 316 of the multifunction apparatus 3000.

In FIG. 3, the controller unit 316 is connected to the scanner 314 functioning as an image input device and the printer 312 functioning as an image output device and is also connected to a local area network such as a LAN 4000 illustrated in FIG. 19 or the public line (WAN) such as PSTN, ISDN, or the like, thereby inputting and outputting the image data and device information.

The network I/F 305 is connected to the network (LAN) 4000 and inputs and outputs the data.

Figure 20:
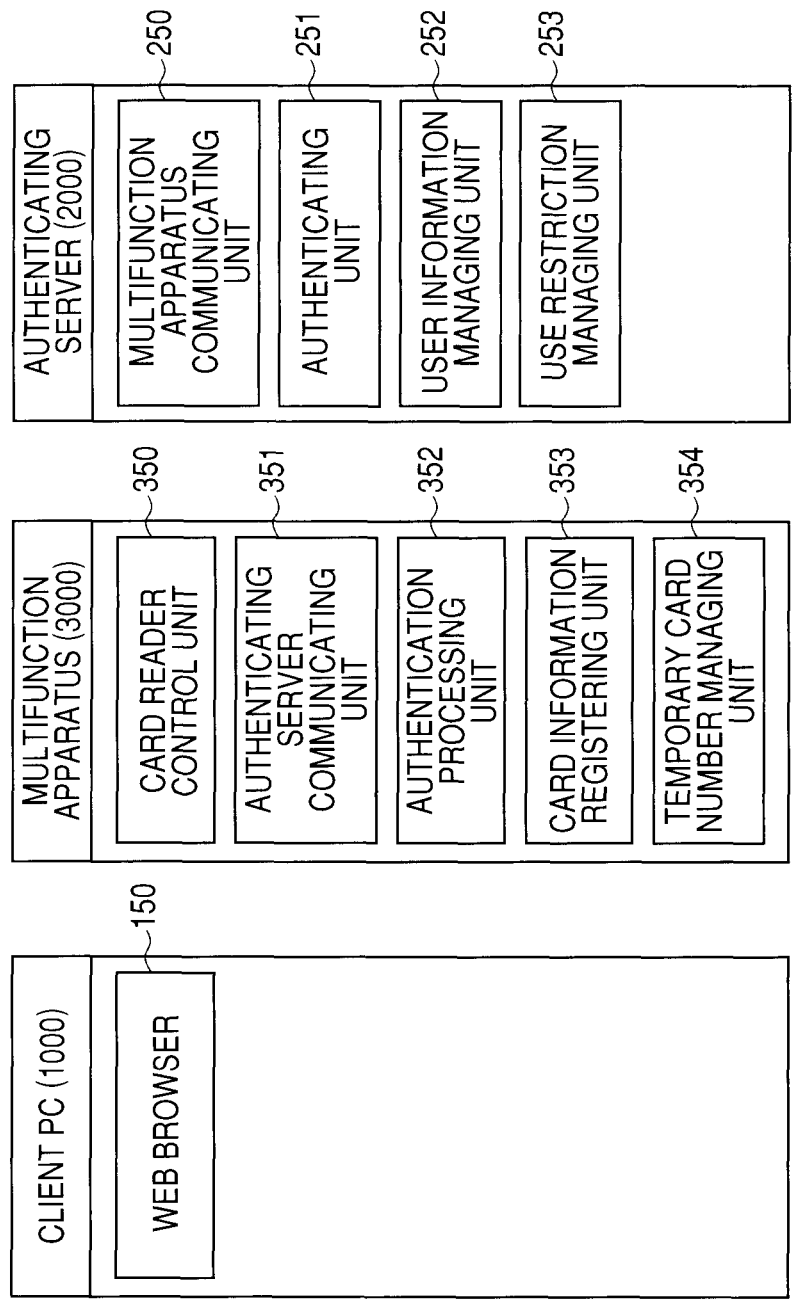
FIG. 20 is a diagram illustrating a functional construction of the image forming system according to the embodiment.
Figure 21:
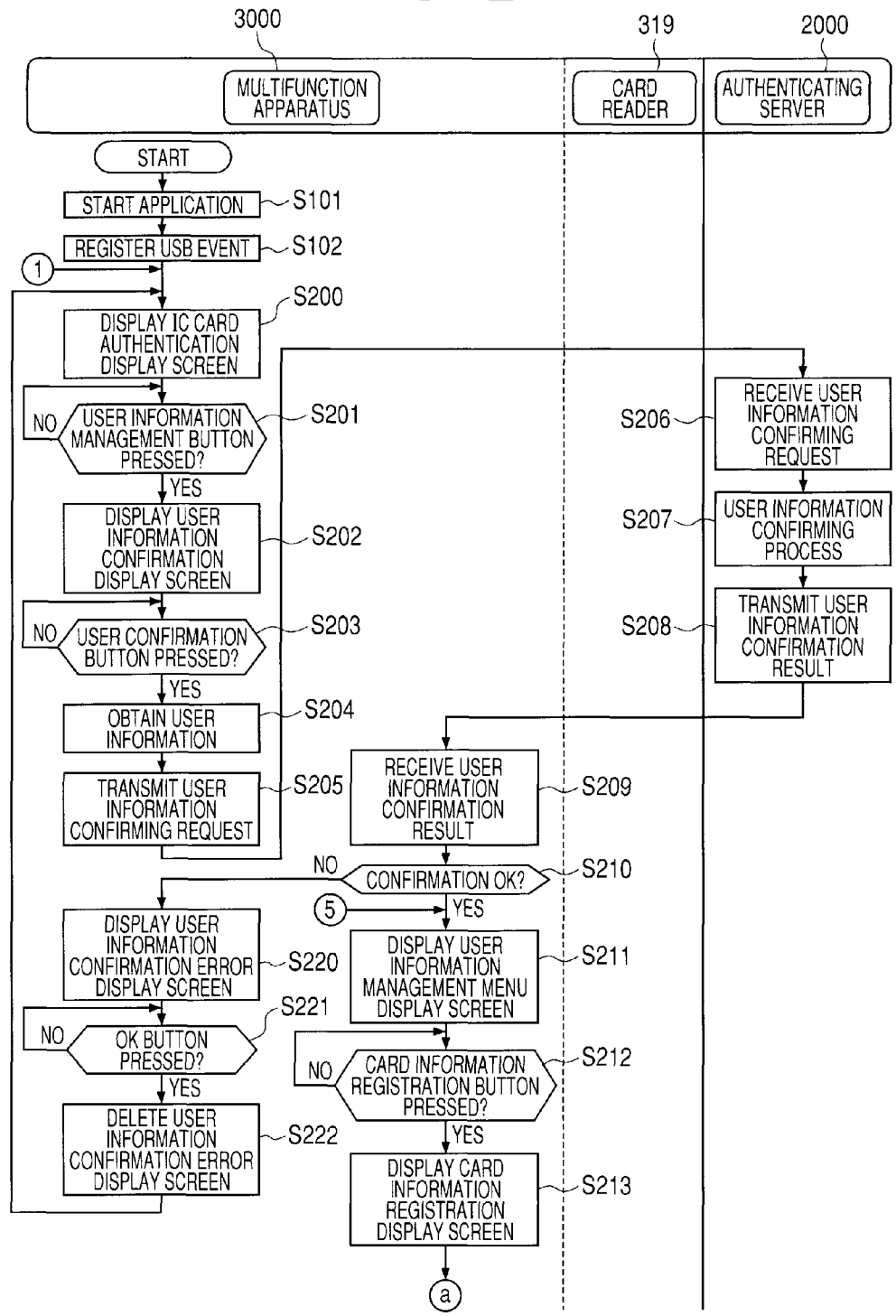
FIG. 21 is a flowchart illustrating a flow for an IC card registering process.

Subsequently, functions of the client PC 1000, the authenticating server 2000, and the multifunction apparatus 3000 as an information processing apparatus of the invention will be described by using FIG. 20. FIG. 20 is a functional block diagram illustrating an example of the functions of the client PC 1000, the authenticating server 2000, and the multifunction apparatus 3000. Details of the processes of each function will be described along flowcharts of FIGS. 21 to 26, which will be described hereinafter.

The client PC 1000 has a function of a Web browser 150 or the like. The Web browser 150 is used to access a Web service of the multifunction apparatus 3000 (not shown). A temporary card list illustrated in FIG. 27, which will be described hereinafter, can be formed on the Web service. As a forming method, the card information may be input to the list which is displayed on the Browser or a temporary card list formed on the client PC 1000 may be uploaded. The invention does not depend on the forming method of the temporary card list.

Figures 27, 28:
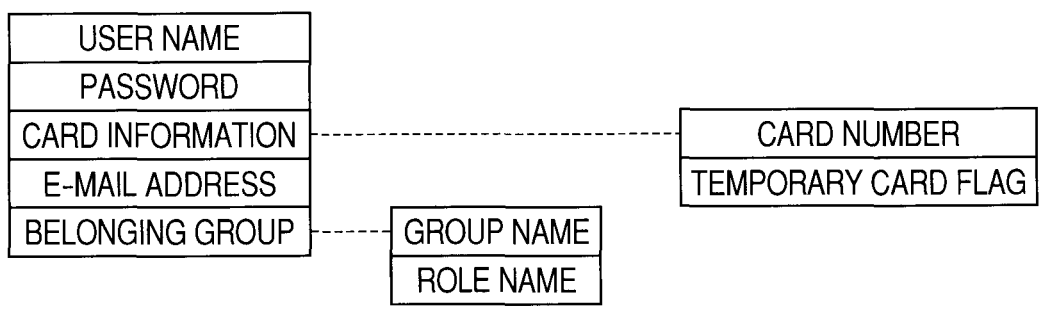
FIG. 27 is a diagram illustrating an example of a temporary card list which is managed in a multifunction apparatus 3000.
FIG. 28 is a diagram illustrating an example of an IC card authenticating table which is managed in an authenticating server 2000.

The authenticating server 2000 has functions of a multifunction apparatus communicating unit 250, an authenticating unit 251, a user information managing unit 252, a use restriction managing unit 253, and the like. The multifunction apparatus communicating unit 250 receives an authenticating request/card information registering request and the like from an authenticating server communicating unit 351 in the multifunction apparatus 3000 and returns an authentication result to the authenticating server communicating unit 351. The authenticating unit 251 obtains the user information which coincides with the card information from an IC card authenticating table illustrated in FIG. 28, which will be described hereinafter, and is held in the authenticating server 2000 in response to the authenticating request received by the multifunction apparatus communicating unit 250. The multifunction apparatus communicating unit 250 transmits an authentication result. The user information managing unit 252 rewrites the IC card authenticating table which is illustrated in FIG. 28 according to a request regarding the user information management such as a card information registering request or the like received by the multifunction apparatus communicating unit 250. The use restriction managing unit 253 compares use restriction information illustrated in FIG. 29 and merges the restriction information. In the processes in the invention, at the time of a temporary card (temporary IC card) log-in, the use restriction information of the relevant user and the designated use restriction information at the time of the temporary card log-in are compared and the use restriction information of a lower authority is used.

The multifunction apparatus 3000 has functions of a card reader control unit 350, the authenticating server communicating unit 351, an authentication processing unit 352, a card information registering unit 353, a temporary card number managing unit 354, and the like. The card reader control unit 350 communicates with the IC card reader 319 connected to the multifunction apparatus 3000 and controls a card reading state of the card reader 319. When the IC card has been put over the card reader, the card information held in the IC card is obtained. The authenticating server communicating unit 351 communicates with the multifunction apparatus communicating unit 250 in the authenticating server 2000 and transmits and receives the authenticating request/card information registering request or the like. The authentication processing unit 352 logs in the multifunction apparatus 3000 according to the authentication result received by the authenticating server communicating unit 351 from the authenticating server 2000. The card information registering unit 353 manages the processes regarding the card information registration and controls a shift or the like of the display screen according to each process. The temporary card number managing unit 354 confirms whether or not the card information of the IC card put over the card reader exists in the temporary card list illustrated in FIG. 27, which will be described hereinafter.

A flow for the authentication information managing process of the temporary card which is executed by the image forming system (information processing system) 1 in the embodiment without intervening the administrator will be described hereinbelow by using FIGS. 21 to 26. FIGS. 21 to 24 are flowcharts illustrating a flow for the card registering process of the multifunction apparatus 3000 in the invention.

First, the CPU 301 of the multifunction apparatus 3000 executes an activating process of an application program for executing the card registering process. That is, the application program stored in the HDD 304 in the multifunction apparatus 3000 is loaded into the RAM 302 and the application program is executed (step 101). The application program has various kinds of functions illustrated in FIG. 20, that is, the functions of the card reader control unit 350, authenticating server communicating unit 351, authentication processing unit 352, card information registering unit 353, and temporary card number managing unit 354.

Subsequently, the CPU 301 sets the connected card reader 319 into a reading start state by the card reader control unit 350 in the multifunction apparatus 3000 (step 102). Thus, an event from the card reader 319 such as card detection, card removal, or the like can be obtained. Card information (manufacturing number) read out of the card is included in the event.

Figure 30:
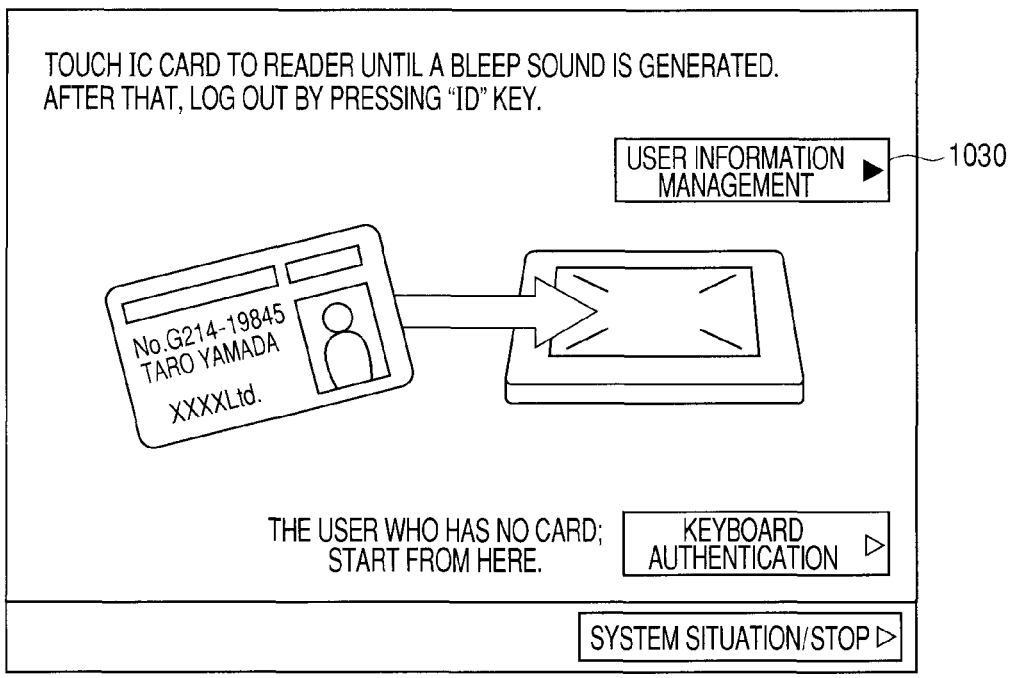
FIG. 30 is an example of an IC card authentication display screen.

Subsequently, the CPU 301 displays an IC card authentication display screen illustrated in FIG. 30 by the authentication processing unit 352 in the multifunction apparatus 3000 (step 200). Then, the CPU 301 detects that a user information management button 1030 on the IC card authentication display screen illustrated in FIG. 30 has been pressed by the card information registering unit 353 in the multifunction apparatus 3000 (step 201). Thus, the operating mode is shifted to a user managing mode. By pressing the card information registration button 1001, the temporary card can be registered. In step 201, a card reading stop command is transmitted to the card reader 319. That is, a polling stop command is transmitted to the card reader 319, thereby preventing the card information from being read out even if the IC card is put over the card reader. Subsequently, the CPU 301 displays a user information confirmation display screen of FIG. 31 by the card information registering unit 353 in the multifunction apparatus 3000 (step 202).

Figure 31:
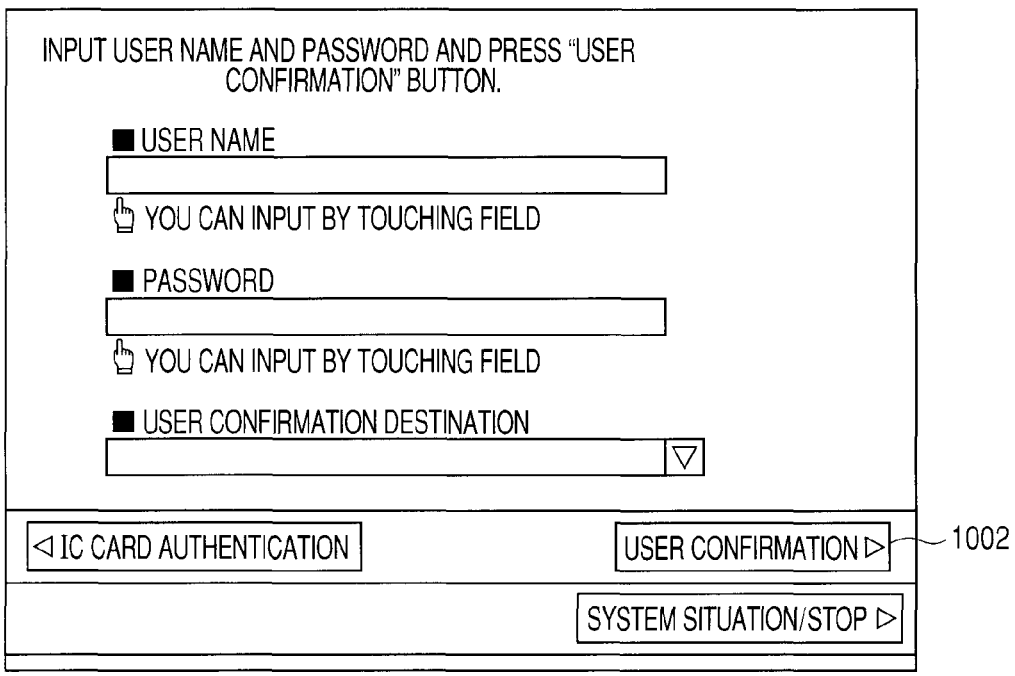
FIG. 31 is an example of a user information management display screen.

The CPU 301 detects that a user confirmation button 1002 on the user information confirmation display screen of FIG. 31 has been pressed by the card information registering unit 353 (step 203) and obtains information input to columns of the user name, password, and user confirmation destination (domain information which is managed by the authenticating server 2000) input onto the user information confirmation display screen of FIG. 31 (step 204). Subsequently, the CPU 301 transmits a user information confirming request (authenticating request) to the authenticating server 2000 by the authenticating server communicating unit 351 in the multifunction apparatus 3000 (step 205) by using the user name, password, and user confirmation destination (domain information which is managed by the authenticating server 2000) obtained in step 208.

The CPU 201 of the authenticating server 2000 receives the user information confirming request (authenticating request) from the authenticating server communicating unit 351 in the multifunction apparatus 3000 by the multifunction apparatus communicating unit 250 in the authenticating server 2000 (step 206). The CPU 201 searches for the relevant user from the IC card authenticating table (FIG. 28) held in the authenticating server 2000 by the authenticating unit 251 in the authenticating server 2000 in response to the user information confirming request (authenticating request) from the multifunction apparatus 3000 and obtains the user information of the relevant user constructed by the user name, E-mail address, use restriction information, and the like (step 207).

FIG. 28 illustrates an example of the user information stored in the authenticating server 2000. The user name (user identification information), password, card information (storing medium identification information), E-mail address, belonging group, and the like have been stored as user information in correspondence to each other. As card information (storing medium identification information), information of the IC card which is used at present (manufacturing number) (storing medium identification information) and a temporary card flag showing whether or not the card which is used at present is a temporary card are stored in correspondence to the user information including the user name (user identification information). The belonging group is associated with a group name and a role name and has been stored and is associated with authority information having a structure as illustrated in FIG. 29, which will be described hereinafter.

At this time, if the user information could be searched for, it is regarded that the authentication is successful, and authentication result information including the user name is formed. If the user information cannot be searched for, it is regarded that the authentication has failed, and authentication result information including authentication failure information is formed. The CPU 201 of the authenticating server 2000 transmits the authentication result (confirmation result) obtained in step 207 to the multifunction apparatus 3000 by the multifunction apparatus communicating unit 250 in the authenticating server 2000 (step 208).

The CPU 301 of the multifunction apparatus 3000 receives the authentication result (confirmation result) by the authenticating server communicating unit 351 (step 209). Although the invention has been constructed in such a manner that when the user information management button 1030 has been pressed in step 201, the user information confirming process in steps 202 to 209 is executed in the embodiment, such a process is not limited to the above timing but the invention may be constructed in such a manner that it is executed when a discrimination result of step 223 in FIG. 22, which will be described hereinafter, is YES (after the button was pressed). That is, the user information confirming process may be executed at any timing so long as it is timing before the authenticating server 2000 registers the card information.

Subsequently, the CPU 301 of the multifunction apparatus 3000 analyzes the contents of the confirmation result received in step 209 by the card information registering unit 353 (step 210). If the authentication is successful (YES in step 210), the processing routine advances to step 211. If the authentication is unsuccessful (NO in step 210), the processing routine advances to step 220.

Figure 33:
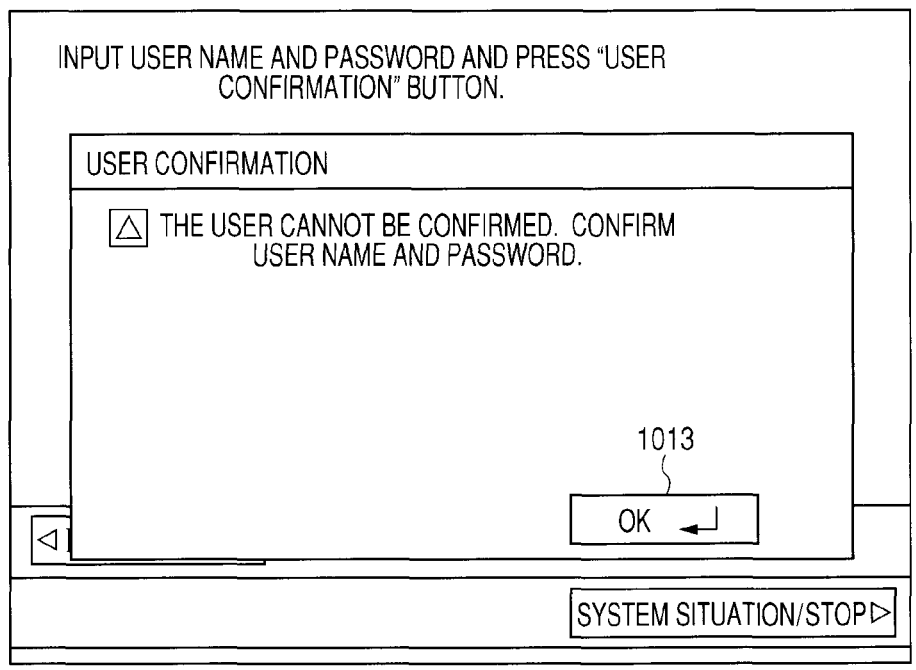
FIG. 33 is an example of a user information confirmation error display screen.

In step 210, if the user information confirmation indicates the authentication failure (NO in step 210), the CPU 301 displays a user information confirmation error display screen illustrated in FIG. 33 by the card information registering unit 353 (step 220). The CPU 301 detects a depression of an OK button 1013 on the user information confirmation error display screen of FIG. 33 by the card information registering unit 353 (step 221). If the depression is detected in step 221 (YES in step 221), the user information confirmation error display screen of FIG. 33 is subsequently deleted and the processing routine is returned to step 200.

Figure 32:
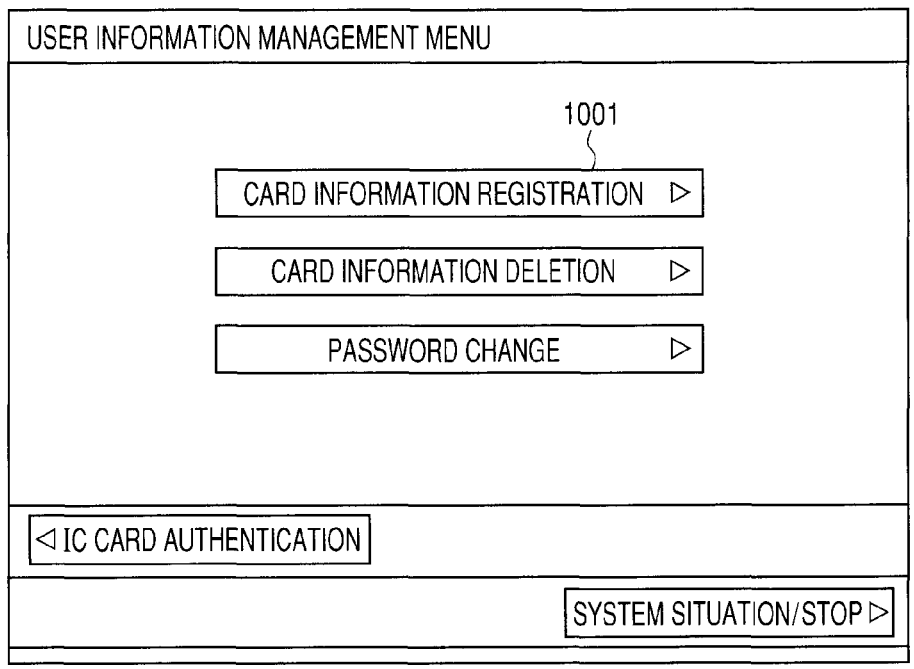
FIG. 32 is an example of a user information management menu display screen.
Figure 34:
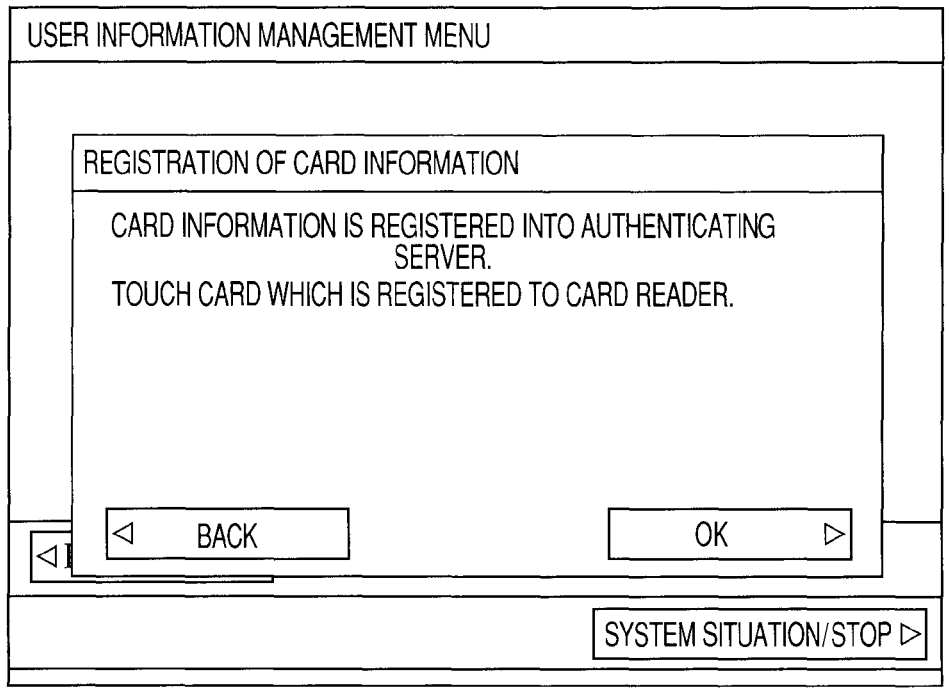
FIG. 34 is an example of a card information registration display screen.

If the authentication success is decided in step 210 (YES in step 210), the CPU 301 of the multifunction apparatus 3000 displays a user information management menu display screen illustrated in FIG. 32 by the card information registering unit 353 (step 211) and detects that the card information registration button 1001 has been pressed (step 212). If the depression of the card information registration button 1001 is detected in step 212 (YES in step 212), the CPU 301 of the multifunction apparatus 3000 displays a card information registration display screen illustrated in FIG. 34 by the card information registering unit 353 (step 213) and transmits a card reading start command to the card reader 319 (step 214 in FIG. 22). That is, an instructing command to start the polling is sent to the card reader 319.

By the process of step 214 mentioned above, the card reader 319 starts the polling and enters a card reading state (step 215). The card reader 319 detects that the card has been put over the card reader, and issues a card detection event including the card information to the multifunction apparatus 3000 (step 216).

Figure 35:
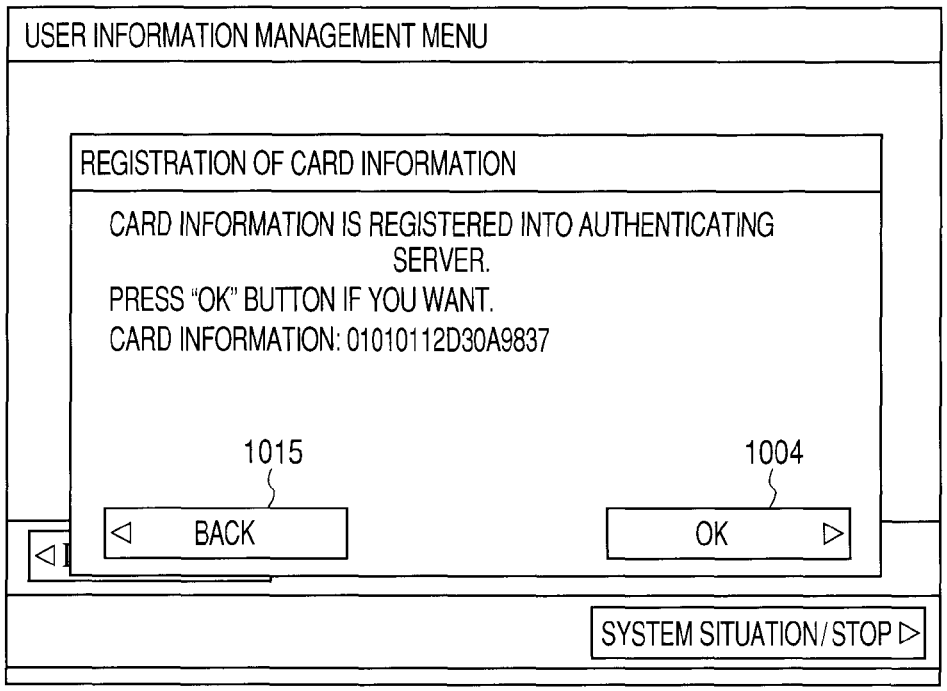
FIG. 35 is an example of the card information registration display screen (display of card information).

The CPU 301 of the multifunction apparatus 3000 receives the card detection event by the card reader control unit 350 (step 217) and obtains the card information (manufacturing number and the like) of the IC card put over the card reader (step 218). The card information of the IC card is included in the card detection event. Subsequently, the CPU 301 of the multifunction apparatus 3000 displays the card information obtained in step 218 onto the card information registration display screen displayed in step 213 as illustrated in FIG. 35 by the card information registering unit 353 (step 219).

Subsequently, the CPU 301 of the multifunction apparatus 3000 detects that a button on a card information indication display screen of FIG. 35 by the card information registering unit 353 (step 223). If an OK button 1004 has been pressed, the processing routine advances to step S224. If a back button 1015 has been pressed, the processing routine is returned to step 211 in FIG. 21 and the user information management menu display screen is displayed.

If the OK button 1004 has been pressed in step 223, the CPU 301 of the multifunction apparatus 3000 confirms by the temporary card number managing unit 354 whether or not the temporary card list (storing medium identification information list which is temporarily allocated) illustrated in FIG. 27 exists, that is, whether or not the temporary card operation is executed (step 224). If the temporary card list does not exist, it is determined that the temporary card operation is not executed (NO in step 224). The processing routine advances to step 251 in FIG. 24. If the temporary card list exists and the temporary card operation is executed (YES in step 224), the processing routine advances to step 225. FIG. 27 illustrates an example of the temporary card list. The card information (manufacturing number) of the temporary card which is temporarily lent to the user is stored as a list. In the embodiment, the temporary card list is held in the external memory 211 of the multifunction apparatus 3000.

Figure 23:
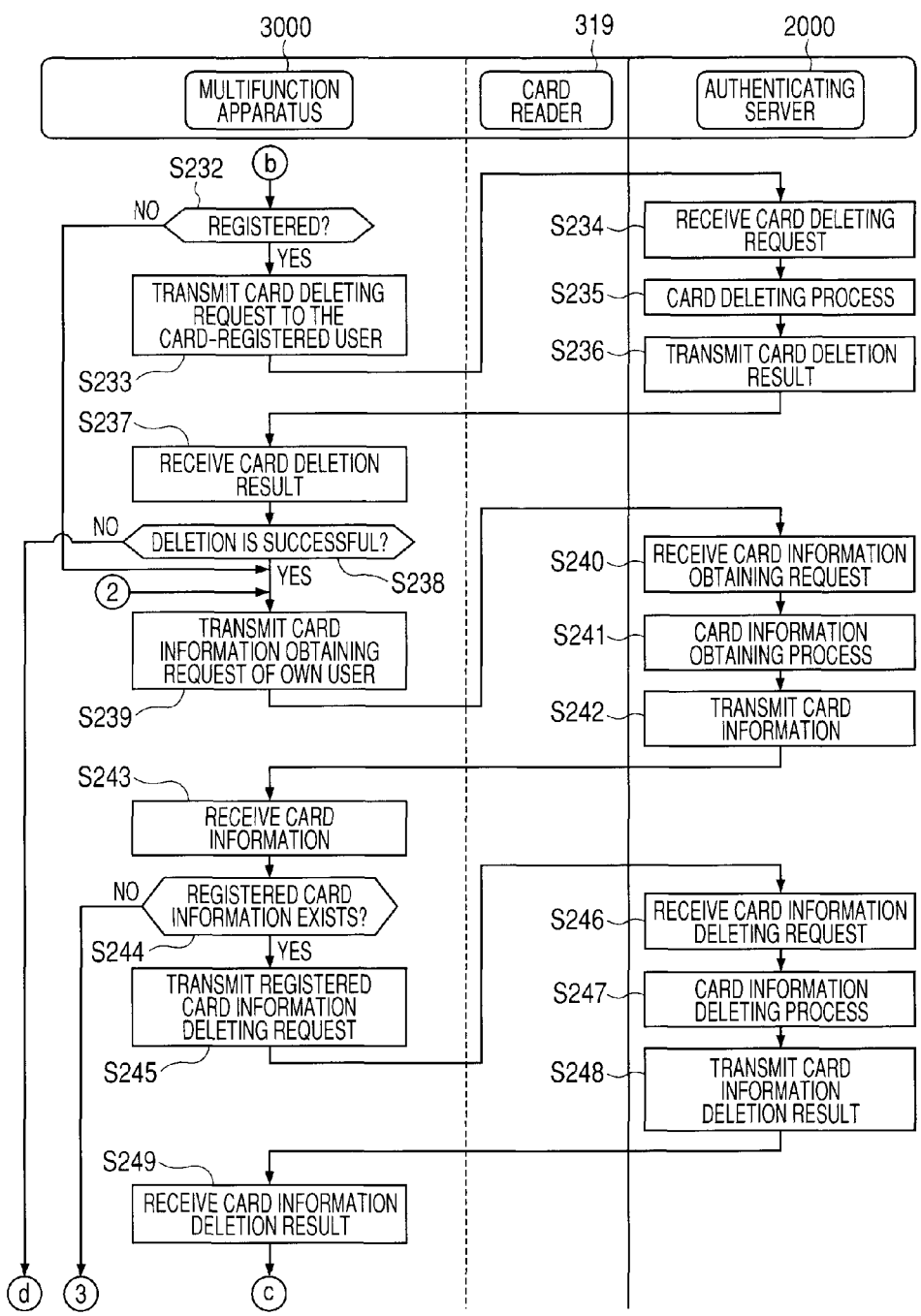
FIG. 23 is a flowchart illustrating a flow for the IC card registering process.
Figure 24:
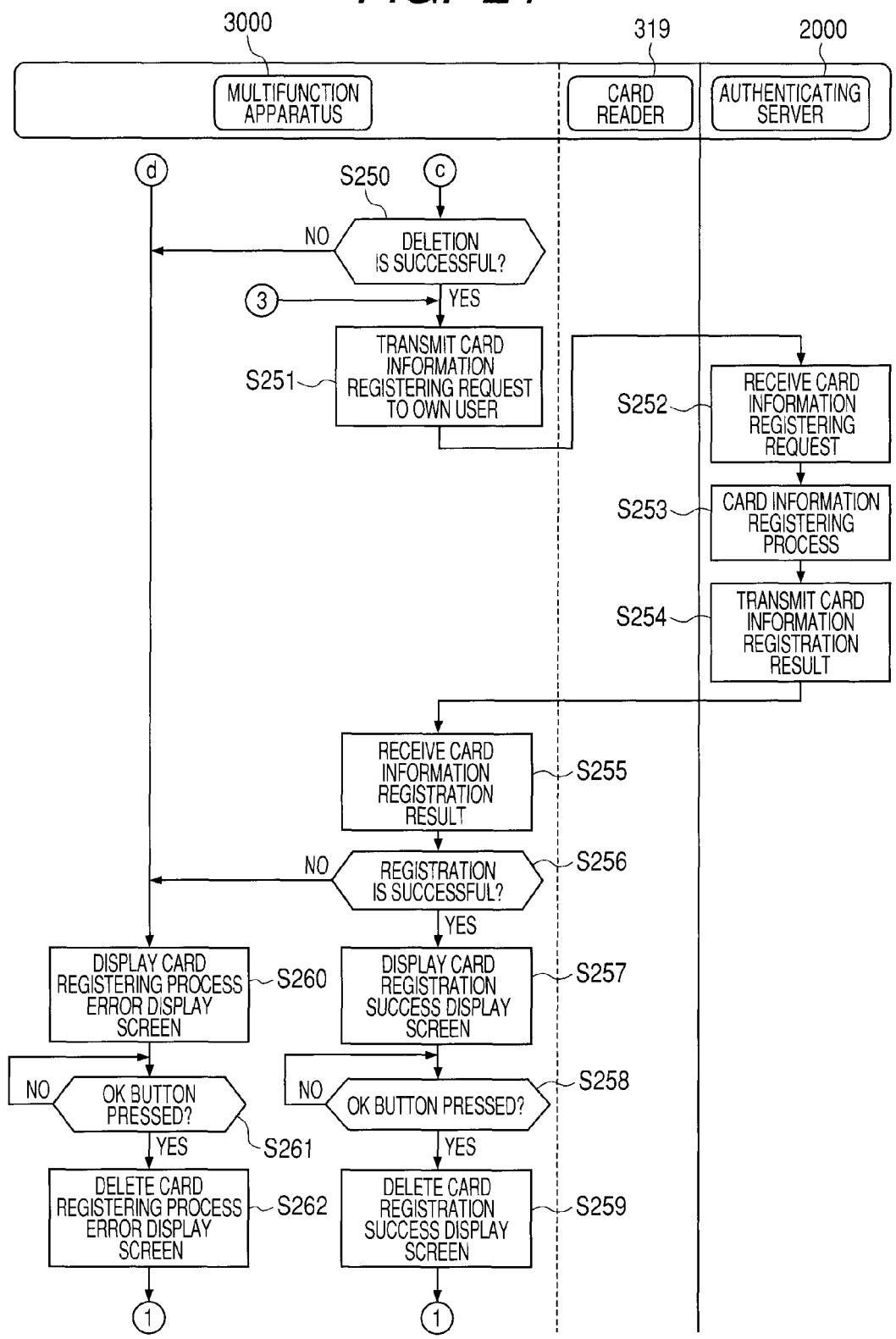
FIG. 24 is a flowchart illustrating a flow for the IC card registering process.

If the temporary operation is not executed (NO in step 224), the processing routine advances to step 251 in FIG. 24. However, in this case, processes of steps 227 to 250, which will be described hereinafter, are not executed but an adding registering process to the IC card authenticating table of his own user is executed. If the temporary card operation is executed (YES in step 224), the CPU 301 obtains the temporary card list illustrated in FIG. 27 by the temporary card number managing unit 354 (step 225) and discriminates whether or not the card information (obtained in step 218) of the card put over the card reader 319 exists in the temporary card list (list of the storing medium identification information of the storing medium which is temporarily allocated to the user) (step 226). In other words, the process of step 226 is a storing medium discriminating process for discriminating whether or not the storing medium identification information which coincides with the storing medium identification information obtained in step 218 exists. If the card information exists in the temporary card list, it is determined that the card of the card information is the temporary card (YES in step 226) and the processing routine advances to step 227. If it does not exist, it is determined that the card is not the temporary card (NO in step 226) and the processing routine advances to step 239 in FIG. 23. An overwriting registering process to the IC card authenticating table of his own user is executed.

In the above description of steps 224 to 226, although it has been constructed so that the temporary card list is held in the external memory 211 of the multifunction apparatus 3000, it may be constructed so that the temporary card list is held in the authenticating server 2000. In this case, it is sufficient that the card information obtained in step 218 is transmitted to the authenticating server 2000 and whether or not the card of the card information is the temporary card list is discriminated in the authenticating server 2000.

Subsequently, the CPU 301 of the multifunction apparatus 3000 discriminates by the authenticating server communicating unit 351 whether or not the temporary card has already been registered in the IC card authenticating table illustrated in FIG. 28, and if it has been registered, the CPU 301 executes a process for deleting it (steps 227 to 237). That is, if the temporary card has been used by another user before, the temporary card has been registered in the IC card authenticating table as a card of another user, and the process for deleting it is executed.

First, the CPU 301 transmits a card information obtaining request of the card information obtained in step 218 to the authenticating server 2000 by the authenticating server communicating unit 351 (step 227). The IC card information (manufacturing number) is included in the card information obtaining request. Subsequently, by the multifunction apparatus communicating unit 250, the CPU 201 of the authenticating server 2000 receives the card information obtaining request sent by the authenticating server communicating unit 351 of the multifunction apparatus 3000 (step 228). After that, by the user information managing unit 252 of the authenticating server 2000, the CPU 201 searches for the user associated with the IC card information (manufacturing number) obtained in step 218 from the IC card authenticating table (FIG. 28) held in the authenticating server 2000 in response to the card information obtaining request sent from the multifunction apparatus 3000 and obtains the user information (user name) (step 229). At this time, if the temporary card is a card which has previously been registered, the card information is obtained and, if it is not registered yet, the card information is not obtained. By the multifunction apparatus communicating unit 250, the CPU 201 of the authenticating server 2000 transmits the user information (user name) obtained as a search result of step 229 to the multifunction apparatus 3000 as card information (step 230).

Subsequently, the CPU 301 of the multifunction apparatus 3000 receives the card information including the user name obtained in step 229 by the authenticating server communicating unit 351 (step 231) and analyzes the card information (step 232). That is, if the card information (user information) could be obtained in step 231, the temporary card has already been registered and the processing routine advances to step 233 in order to delete the registration. If the card information cannot be obtained, the temporary card is not registered yet and the processing routine advances to step 239 in order to execute the registering process. If the card information obtained in step 231 has been registered in the user obtained in step 204, that is, if the temporary card has already been correctly registered by the same user before, a message showing that it has already been registered may be displayed and the processing routine may be finished. In this case, in the case where the card information obtained in step 231 has been registered into a user other than the user obtained in step 204, the processing routine advances to step 233 and a process for deleting the registration is executed.

If the temporary card has been registered in step 232, the CPU 301 of the multifunction apparatus 3000 forms a deletion requesting command of the relevant card from the card information obtained in step 231 and transmits to the authenticating server 2000 by the authenticating server communicating unit 351 (step 233). The user name, the IC card information (manufacturing number), and the like are included in the deletion requesting command. The above process is such a process that in order to prevent the same temporary card from being used by a plurality of users, if the temporary card has been registered for another user, the temporary card information is deleted from the user information in the IC card authenticating table held in the authenticating server 2000.

The CPU 201 of the authenticating server 2000 receives the card information deleting request sent from the authenticating server communicating unit 351 by the multifunction apparatus authenticating unit 251 (step 234). The CPU 201 obtains the user name and the IC card information included in the card information deleting request from the multifunction apparatus 3000 by the user information managing unit 252, searches for the user name from the IC card authenticating table illustrated in FIG. 28, and deletes the IC card information associated with the user name (step 235). The data which is deleted here is a card number table in the IC card authenticating table (FIG. 28). The CPU 201 of the authenticating server 2000 transmits a deletion result of step 235 to the multifunction apparatus 3000 (step 236) by the multifunction apparatus authenticating unit 251. The deletion result is information showing the deletion success or failure.

The CPU 301 of the multifunction apparatus 3000 receives the deletion result by the authenticating server communicating unit 351 (step 237) and analyzes the deletion result received in step 237 by the card information registering unit 353 (step 238). If the deletion is successful (YES in step 238), the processing routine advances to step 239 in order to register the temporary card information. If the deletion has failed (NO in step 238), the processing routine advances to step 260 in FIG. 24, which will be described hereinafter, in order to display error information.

Figure 22:
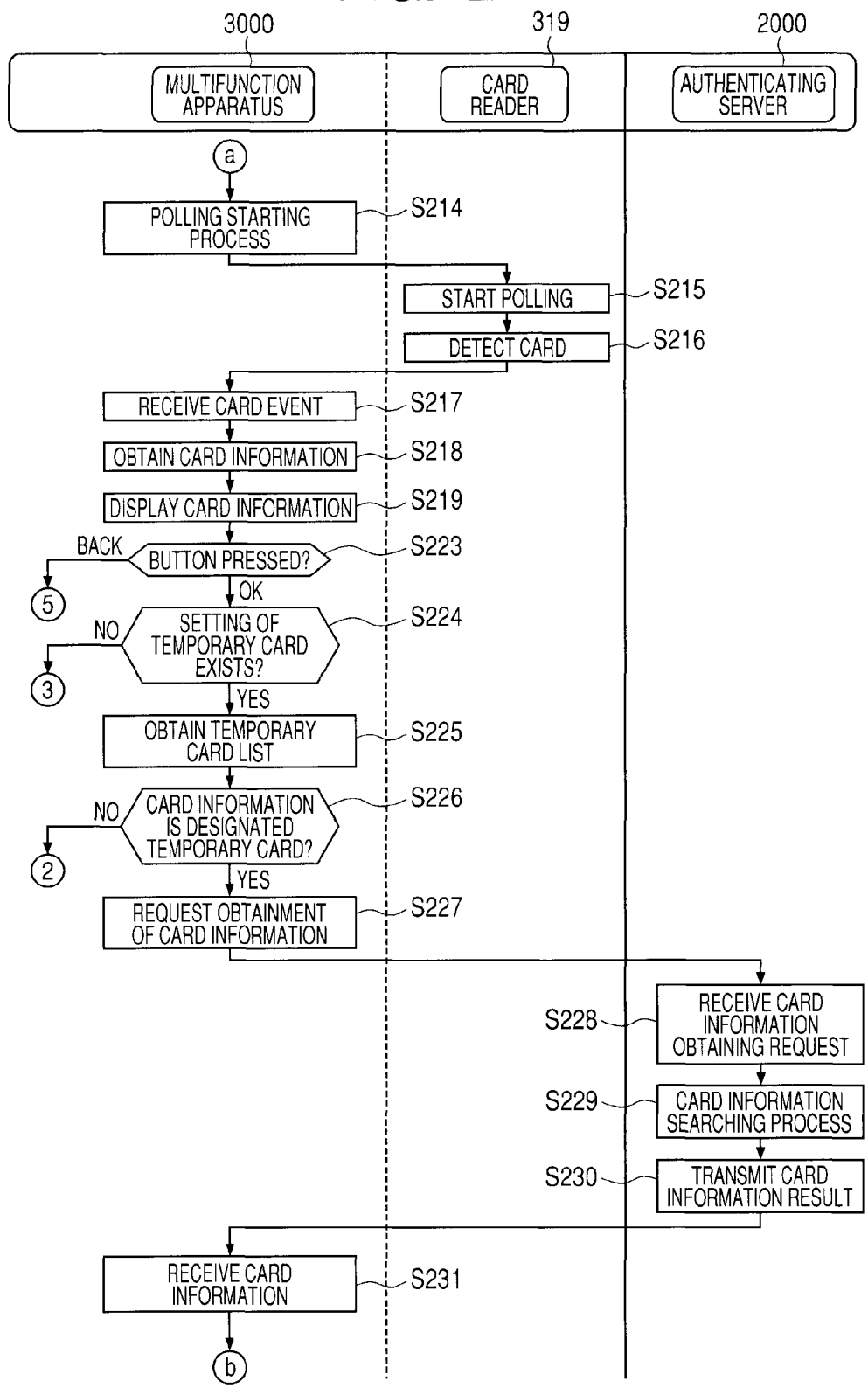
FIG. 22 is a flowchart illustrating a flow for the IC card registering process.

If the deletion of the card information is successful in step 238 (YES in step 238) and if the card put over the card reader 319 is not the temporary card in step 226 in FIG. 22 mentioned above (NO in step 226), by processes of steps 239 to 249, whether or not some IC card information has already been registered in his own user information in the IC card authenticating table held in the authenticating server 2000 is discriminated and, if it has been registered, a process for deleting the IC card information is executed. Such a process is provided to perform the operation of one IC card per user and by deleting the already registered temporary IC card information by the processes of steps 245 to 249, even if the user forgot to execute the deleting process of the temporary card information after the temporary card had been returned, by newly registering his own IC card information, the temporary card information is deleted, so that a malicious use due to impersonation can be prevented.

First, the CPU 301 of the multifunction apparatus 3000 transmits the card information obtaining request of his own user to the authenticating server 2000 by the authenticating server communicating unit 351 (step 239). The user name is included in the transmitted data. Subsequently, the CPU 201 of the authenticating server 2000 receives the card information obtaining request sent from the authenticating server communicating unit 351 by the multifunction apparatus communicating unit 250 (step 240) and obtains the card information list in response to the card information obtaining request from the multifunction apparatus 3000 by the user information managing unit 252 (step 241). That is, the user name obtained in step 240 is searched for from the IC card authenticating table illustrated in FIG. 28 and all of the IC card information associated with the relevant user name is obtained. The CPU 201 of the authenticating server 2000 transmits the card information list as a list of the IC card information which has been registered in the user and obtained in step 241 to the multifunction apparatus 3000 by the multifunction apparatus communicating unit 250 (step 242).

The CPU 301 of the multifunction apparatus 3000 receives the card information list by the authenticating server communicating unit 351 (step 243) and analyzes the card information list obtained in step 243 by the card information registering unit 353 (step 244). If the card information has been obtained (YES in step 244), that is, if the card information has been registered, the processing routine advances to step 245 in order to delete the registered IC card information. If the card information is not obtained (NO in step 244), that is, if the card information is not registered, the processing routine advances to step 251 in FIG. 24, which will be described hereinafter, in order to register the card information of the temporary card.

If the card information has been registered in step 244 (YES in step 244), the process for deleting the registered card information (steps 245 to 249) is executed. That is, the CPU 301 of the multifunction apparatus 3000 transmits the card information deleting request of the card information list obtained in step 243 to the authenticating server 2000 by the authenticating server communicating unit 351 (step 245). A list of the user names and the IC card information (manufacturing numbers) is included in the transmission data.

The CPU 201 of the authenticating server 2000 receives the card information deleting request sent from the authenticating server communicating unit 351 by the multifunction apparatus communicating unit 250 (step 246) and deletes the card information from the IC card authenticating table illustrated in FIG. 28 by the user information managing unit 252 in response to the card information deleting request from the multifunction apparatus 3000 (step 247). That is, the relevant user name obtained in step 245 is searched for from the IC card authenticating table (FIG. 28) and all of the IC card information associated with the relevant user name is deleted. The user information is not deleted here. The CPU 201 of the authenticating server 2000 transmits a deletion result of the card information deletion executed in step 247 to the multifunction apparatus 3000 by the multifunction apparatus communicating unit 250 (step 248). The deletion result is a result flag (success or failure) showing the deletion result.

The CPU 301 of the multifunction apparatus 3000 receives the deletion result by the authenticating server communicating unit 351 (step 249) and analyzes the card deletion result received in step 249 by the card information registering unit 353 (step 250). If the deletion is successful (YES in step 250), the processing routine advances to step 251 in order to register the card information of the temporary card. If the deletion has failed (NO in step 250), the processing routine advances to step 260 in FIG. 24, which will be described hereinafter, in order to display the error information.

If it is decided that the deletion is successful in step 250 (YES in step 250), or if the temporary card setting does not exist in the multifunction apparatus 3000 in step 224 in FIG. 22 mentioned before (NO in step 224), or if the registered card information does not exist in the IC card authenticating table of the relevant user in step 244 in FIG. 23 mentioned before (NO in step 244), the registering process of the card in which the card information (manufacturing number) of the card which has actually been put over the card reader 319 is registered into the IC card authenticating table is executed by processes of steps 251 to 255. If the processes of steps 239 to 249 were executed, since the IC card information in his own user information has already been deleted, an overwriting registration is executed.

First, the CPU 301 of the multifunction apparatus 3000 transmits the card information registering request of the card information of the IC card obtained in step 218 to the authenticating server 2000 by the authenticating server communicating unit 351 (step 251). The user name, IC card information, and temporary card flag are included in the card information registering request. The temporary card flag indicates that the relevant card is the temporary card. If the relevant card exists on the temporary card list illustrated in FIG. 27 in step 226 in FIG. 22 mentioned before and it is determined that the card is the temporary card (YES in step 226), a value of "True" is input into the temporary card flag of a temporary card registering request. If it is determined in step 226 that the card is not the temporary card (NO in step 226) and if the setting of the temporary card operation does not exist in the multifunction apparatus 3000 in step 224 in FIG. 22 (NO in step 224), a value of "False" is input into the temporary card flag of the temporary card registering request.

Subsequently, the CPU 201 of the authenticating server 2000 receives the card information registering request (user name, IC card information, temporary card flag) sent from the authenticating server communicating unit 351 by the multifunction apparatus communicating unit 250 (step 252) and adds the card information into the IC card authenticating table (FIG. 28) by the user information managing unit 252 in response to the card information registering request from the multifunction apparatus 3000 (step 253). That is, the user name obtained in step 252 is searched for from the IC card authenticating table (FIG. 28) and the IC card information and the temporary card flag obtained in step 252 are registered into the user information. The CPU 201 of the authenticating server 2000 transmits the registration result (success or failure of the registration) of step 253 to the multifunction apparatus 3000 by the multifunction apparatus communicating unit 250 (step 254).

The CPU 301 of the multifunction apparatus 3000 receives the registration result by the authenticating server communicating unit 351 (step 255) and analyzes the card registration result received in step 255 by the card information registering unit 353 (step 256). If the registration is successful (YES in step 256), the processing routine advances to step 257 in order to display a message showing that the registration is successful. If the registration has failed (NO in step 256), the processing routine advances to step 260 in order to display the error information.

Figure 36:
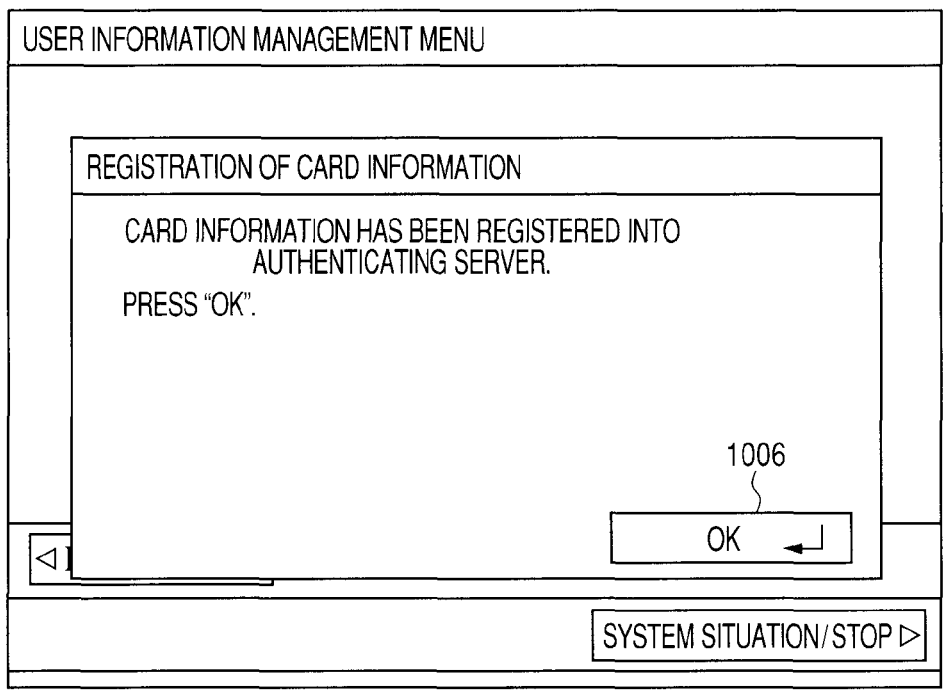
FIG. 36 is an example of the card information registration display screen (display of success in registration).

If the registration is successful (YES in step 256), the CPU 301 of the multifunction apparatus 3000 displays a card registration success display screen illustrated in FIG. 36 by the card information registering unit 353 (step 257). The CPU 301 detects a depression of an OK button 1006 on the card registration success display screen (step 258) and deletes the card registration success display screen of FIG. 36 (step 259) and the processing routine is returned to step 200 in FIG. 21.

Figure 37:
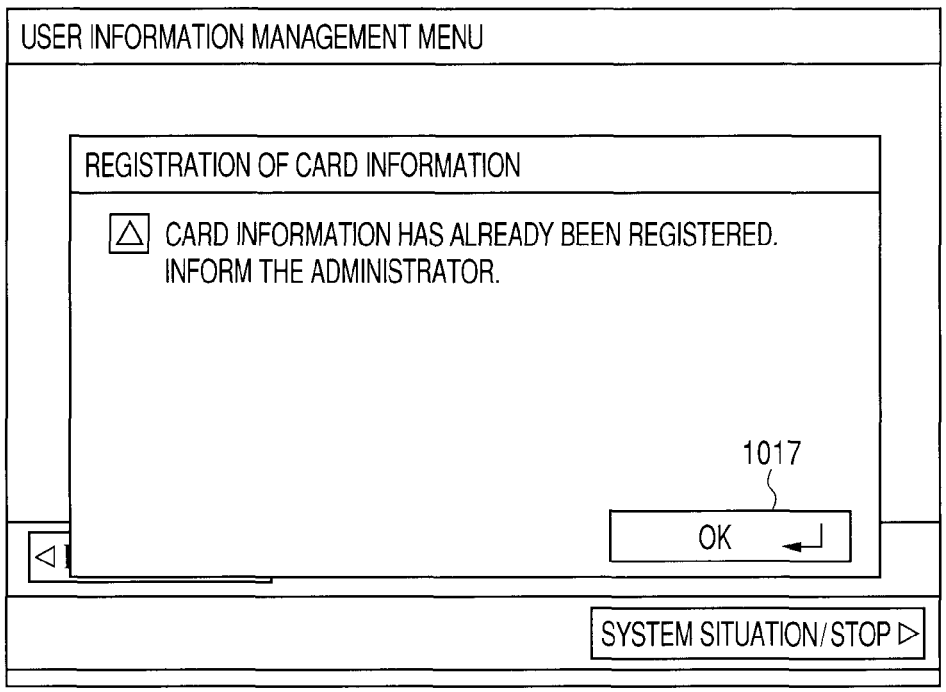
FIG. 37 is an example of the card information registration display screen (error of a registering process).

If the registration has failed (NO in step 256), or if the card information which has been registered with respect to the relevant user cannot be deleted from the IC card authenticating table in step 250 (NO in step 250), or if the card information of the user who used the temporary card at the previous time cannot be deleted from the IC card authenticating table in step 238 in FIG. 23 (NO in step 238), the CPU 301 of the multifunction apparatus 3000 displays a card registering process error display screen as illustrated in FIG. 37 by the card information registering unit 353 (step 260). A message which is displayed on the card registering process error display screen can be changed according to the error contents. The CPU 301 detects a depression of an OK button 1017 on the card registering process error display screen (step 261) and deletes the card registering process error display screen of FIG. 37 (step 262) and the processing routine is returned to step 200 in FIG. 21.

By the above processes, the registration of the ordinary IC card which is used by the user or the temporary card into the IC card authenticating table is completed. Thus, in addition to the user name, password, E-mail address, belonging group, and the like, the card information is registered as information of the relevant user in the IC card authenticating table illustrated in FIG. 28. The card information is the card number (manufacturing number of the IC card) and the temporary card flag. If the card which is used is the temporary card, the temporary card flag is set to "True". In the case of the ordinary own card, the temporary card flag is set to "False".

In the card information registering process by the flowcharts of FIGS. 21 to 24 described above, the operation of one IC card per user is considered as a prerequisite. If another IC card has been registered into the IC card authenticating table or if the information of the temporary card used before has been registered into the IC card authenticating table, first, their IC card information is deleted and, subsequently, the registration is performed (overwriting registration).

Figure 40:
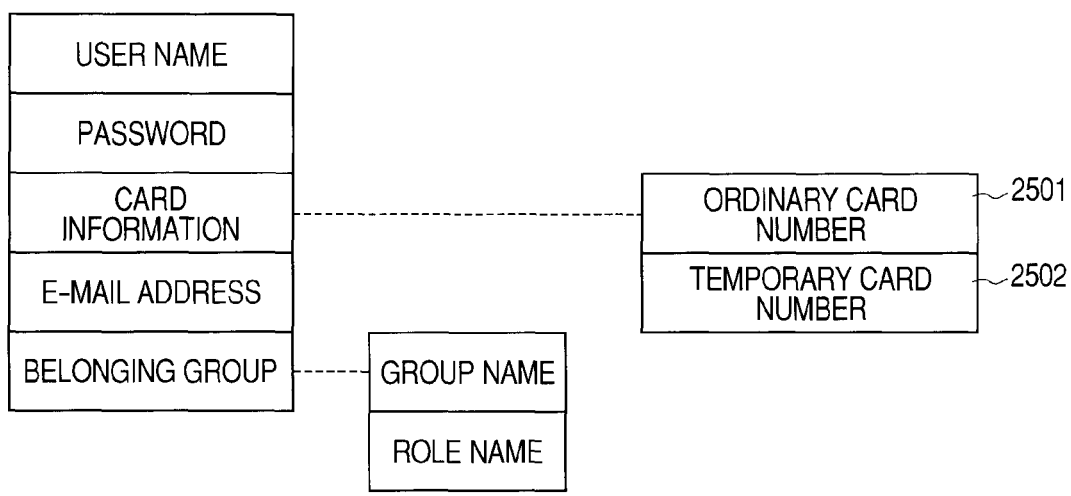
FIG. 40 is a diagram illustrating an example of the IC card authenticating table which is managed in the authenticating server 2000.

Besides the case of performing the overwrite registration by using the IC card authenticating table of FIG. 28 as mentioned above, for example, a method whereby an authentication table (2501) for his own card (IC card which is ordinarily used) and an authentication table (2502) for the temporary card are separately provided by using a table for authenticating the IC card in FIG. 40 can be also used. If it is decided in step 226 that the card information indicates the card number of the IC card which is ordinarily used (NO in step 226), the card number of the IC card which is ordinarily used is registered into the table 2501 in step 253. If it is decided in step 226 that the card information indicates the card number of the temporary card (YES in step 226), the card number of the temporary card is registered into the table 2502 in step 253. Such a form can be particularly effectively applied to, for example, the case where the IC card which is ordinarily used is generally used, and when the user forgot to bring the card which is ordinarily used, if he borrows the temporary card and registers the card number of the temporary card. If the authentication using the card which is ordinarily used is made on the day next to the day when the temporary card was allocated, the card number of the card which is ordinarily used is not deleted and the log-in can be performed without registering again the card which is ordinarily used.

After the card number of the temporary card was registered, if the authentication is made by the IC card which is ordinarily used, since the card number of the IC card which is ordinarily used has been registered into the table 2501, it is determined in step 306, which will be described hereinafter, that the user exists. If the presence of the user is determined (YES in step 306), whether or not the temporary card number has been registered in the table 2502 is discriminated. It is constructed in such a manner that if the temporary card number has been registered, the temporary card number is deleted from the table 2502.

Figure 25:
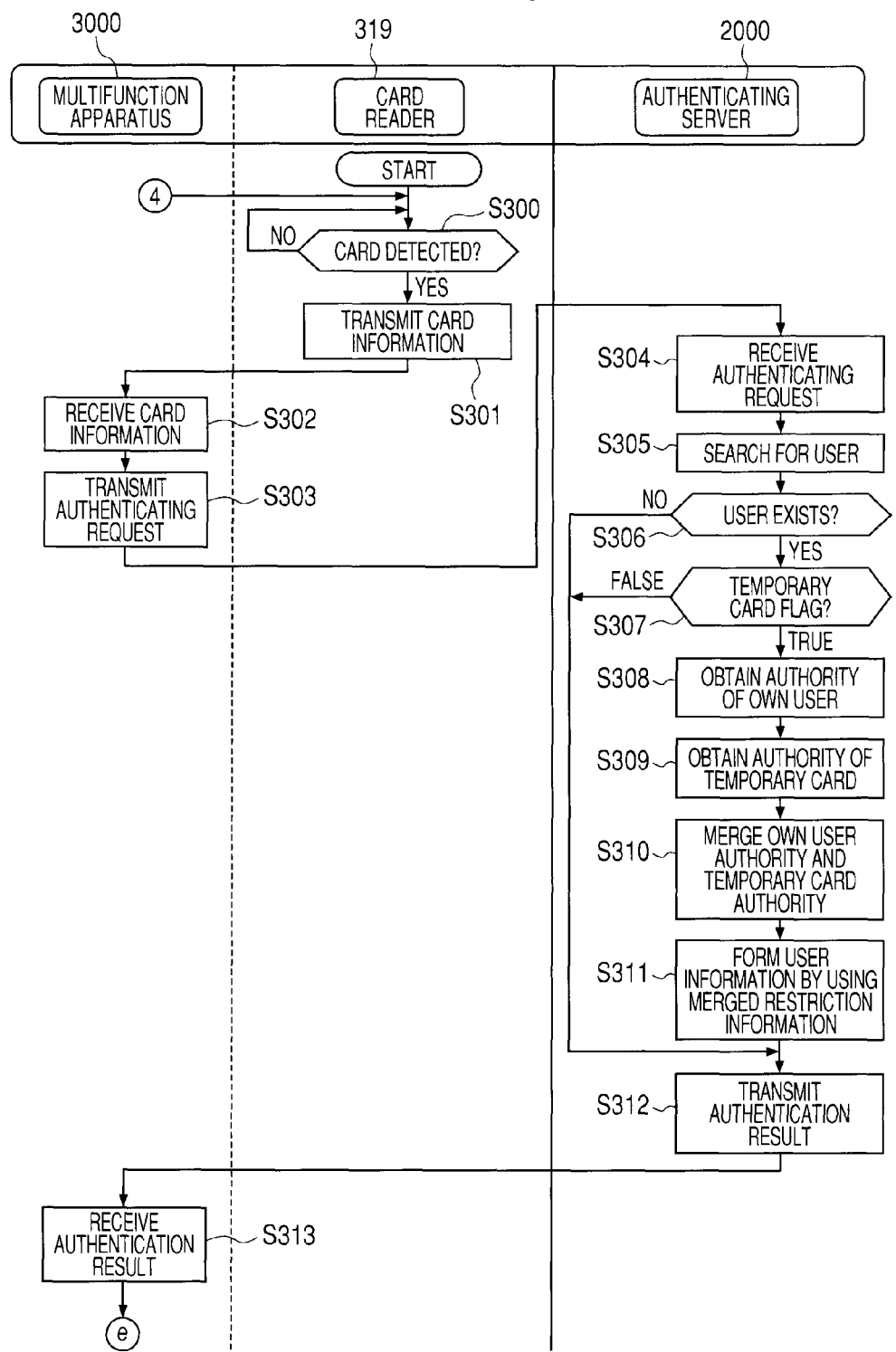
FIG. 25 is a flowchart illustrating a flow for a card authenticating process.
Figure 26:
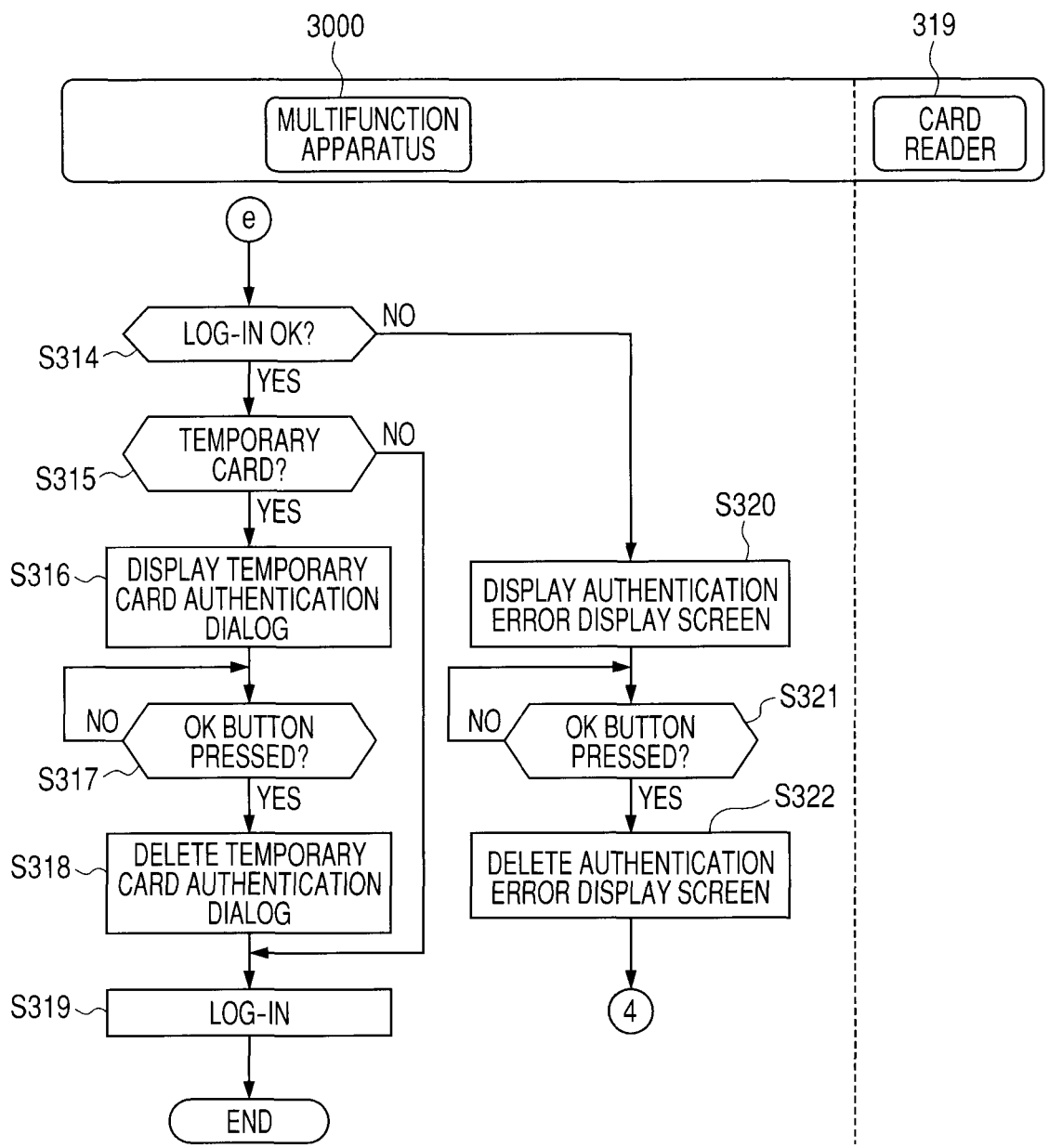
FIG. 26 is a flowchart illustrating a flow for the card authenticating process.

Subsequently, a card authenticating process in the embodiment will now be described by using FIGS. 25 and 26. FIGS. 25 and 26 are flowcharts illustrating a flow for the card authenticating process.

The IC card reader 319 connected to the multifunction apparatus 3000 detects that the IC card has been put over the card reader (step 300). When the IC card is detected, the IC card reader 319 obtains the IC card information (manufacturing number) and transmits the card detection event to the multifunction apparatus 3000 together with the obtained IC card information (manufacturing number) (step 301).

The CPU 301 of the multifunction apparatus 3000 receives the card detection event and obtains the IC card information (manufacturing number) of the IC card put over the card reader by the card reader control unit 350 (step 302). Subsequently, the CPU 301 of the multifunction apparatus 3000 transmits the authenticating request including the IC card information obtained in step 302 to the authenticating server 2000 by the authenticating server communicating unit 351 (step 303).

The CPU 201 of the authenticating server 2000 receives the authenticating request including the IC card information sent from the authenticating server communicating unit 351 by the multifunction apparatus communicating unit 250 (step 304). By the authenticating unit 251, the CPU 201 searches for the IC card information obtained in step 302 from the IC card authenticating table (FIG. 28) held in the authenticating server in response to the authenticating request from the multifunction apparatus 3000 (step 305). That is, whether or not the IC card information exists is discriminated by searching the IC card authenticating table illustrated in FIG. 28. In the case where the IC card had been registered, since the IC card information and the user information have associatively been stored in the IC card authenticating table, if the IC card information exists in the IC card authenticating table, the user information has been registered and the authentication is successful.

The CPU 201 of the authenticating server 2000 discriminates the authentication result of step 305 by the authenticating unit 251 (step 306). That is, when the IC card information exists in the IC card authenticating table, the user information has been registered and the authentication is successful (YES in step 306) and the processing routine advances to step 307 in order to decide the use authority of the multifunction apparatuses 3000 of the relevant user. If the IC card information does not exist in the IC card authenticating table, the user information is not registered and the authentication has failed (NO in step 306) and the processing routine advances to step 312 in order to finish the authenticating process as being a failure.

If the user information has been registered in step 306 (YES in step 306), the CPU 201 of the authenticating server 2000 discriminates by the authenticating unit 251 whether the temporary card flag in the IC card authenticating table of the card of the IC card information searched in step 305 is equal to "True" or "False" (step 307). When the temporary card flag is equal to "True", the IC card is the temporary card (True in step 307) and the processing routine advances to step 308 in order to merge his own user authority and the temporary card authority. When the temporary card flag is equal to "False", the IC card is not the temporary card but is determined to be his own card and the processing routine advances to step 312. In the case of his own card, his own user authority is used as it is.

When the flag is equal to "True" and the IC card is determined to be the temporary card in step 307, the CPU 201 of the authenticating server 2000 obtains the use restriction information regarding the user obtained in step 305 from the IC card authenticating table (FIG. 28) by the use restriction managing unit 253 (step 308). That is, the relevant user name obtained in step 305 is searched for from the IC card authenticating table (FIG. 28), the group name associated with the user information is obtained, further, the role name associated with the relevant group is obtained, and the use restriction information associated with the role name is obtained. The reason why the user, the group, and the role are associated is to allow the user to easily perform a use restriction management. It is assumed that the user certainly belongs to one or more groups. It is also assumed that one or more roles have been set into the group. By using such a construction, the user is certainly associated with one or more roles. When the user is associated with one or more roles, respective items in the use restriction information as illustrated in FIG. 29 are compared and the item having a stronger authority (weaker restriction) is obtained as use restriction information of his own user. This use restriction information becomes function restriction information for restricting the functions of the multifunction apparatus 3000. FIG. 29 illustrates an example of an authority information structure stored in the authenticating server 2000 and defines the restriction of the functions which can be used by the multifunction apparatus 3000.

Subsequently, the CPU 201 of the authenticating server 2000 obtains the use restriction information of the role designated in a temporary role (including the temporary role and an entry of the role name) held in the authenticating server 2000 by the use restriction managing unit 253 (step 309).

The temporary role is a setting file for deciding the role (authority) of the temporary card stored in the authenticating server 2000. A role name showing the authority for the card number stored in the temporary card list of FIG. 27 is disclosed. That is, the role name designated in the temporary role is obtained by the use restriction managing unit 253 and the use restriction information associated with the role name is obtained.

Subsequently, by the use restriction managing unit 253, the CPU 201 of the authenticating server 2000 compares the use restriction information of his own user obtained in step 308 with the use restriction information of the role designated in the temporary role obtained in step 309 and obtains the use restriction information having a weaker authority (stronger restriction) as the relevant use restriction information (step 310). For example, in the use restriction of the role set into the user, it is assumed that the color copy is set to "No restriction". On the other hand, in the use restriction of the role designated in the temporary role, it is assumed that the color copy is set to "Only monochromatic copy can be performed". In this case, as a merged use restriction of the temporary card, "Only monochromatic copy can be performed" having a weaker authority is reflected. In step 308, although the use restriction information having the stronger authority is applied in the case where the user is associated with a plurality of roles, the use restriction information having the weaker authority is applied in the merging process with the temporary role.

Subsequently, by the use restriction managing unit 253, the CPU 201 of the authenticating server 2000 forms the user information (user name, E-mail address, temporary card flag, use restriction information) which is necessary for authentication and includes the user information (user name, E-mail address, temporary card flag) obtained in step 305 and the use restriction information obtained in step 310 (step 311).

After step 311 and when the user information does not exist in step 306 (NO in step 306) and when the temporary card flag is equal to "False" in step 307 (False in step 307), the CPU 201 of the authenticating server 2000 transmits the authentication result or the user information including the authentication result and the use restriction information to the multifunction apparatus 3000 by the multifunction apparatus communicating unit 250 (step 312). At this time, when the user information does not exist in step 306 (NO in step 306), information showing that the IC card is not registered (authentication is unsuccessful) is sent to the multifunction apparatus 3000 as an authentication result. When the temporary card flag is equal to "False" in step 307 (False in step 307), although not shown, the use restriction information associated with the user name obtained by the user search in step 305 is obtained and sent as user information to the multifunction apparatus 3000. The authentication result in this case and that after step 311 indicates the authentication success because the IC card has been registered.

Figure 39:
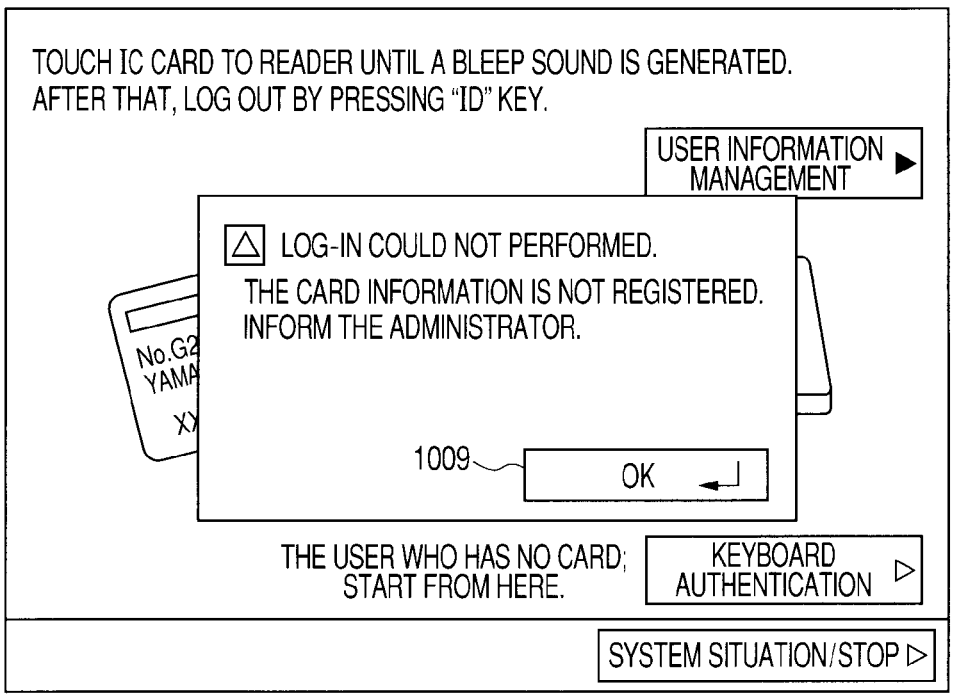
FIG. 39 is an example of an authentication error display screen.

The CPU 301 of the multifunction apparatus 3000 receives the authentication result (step 313) by the authenticating server communicating unit 351 and analyzes the authentication result obtained in step 313 by the authentication processing unit 352 (step 314). If the authentication result indicates the authentication success (YES in step 314), the processing routine advances to step 315 in order to execute the log-in process. If the authentication result indicates the authentication failure (NO in step 314), the processing routine advances to step 320 in order to display an error display screen. That is, the CPU 301 displays an authentication error display screen as illustrated in FIG. 39 by the authentication processing unit 352 (step 320) and detects a depression of an OK button 1009 on the authentication error display screen (step 321). After the detection, the authentication error display screen is deleted (step 322). The processing routine is returned to step 300 in FIG. 25 and the system waits until a new IC card is put over the card reader.

If the authentication result indicates the authentication success in step 314 (YES in step 314), the CPU 301 of the multifunction apparatus 3000 confirms the temporary card flag in the user information obtained in step 313 by the authentication processing unit 352 (step 315). When the temporary card flag is "True" (YES in step 315), the IC card is the temporary card and the processing routine advances to step 316 in order to display a temporary card authentication dialog display screen. When the temporary card flag is "False" (NO in step 315), the IC card is his own IC card and the processing routine advances to step 319 in order to log in as it is.

Figure 38:
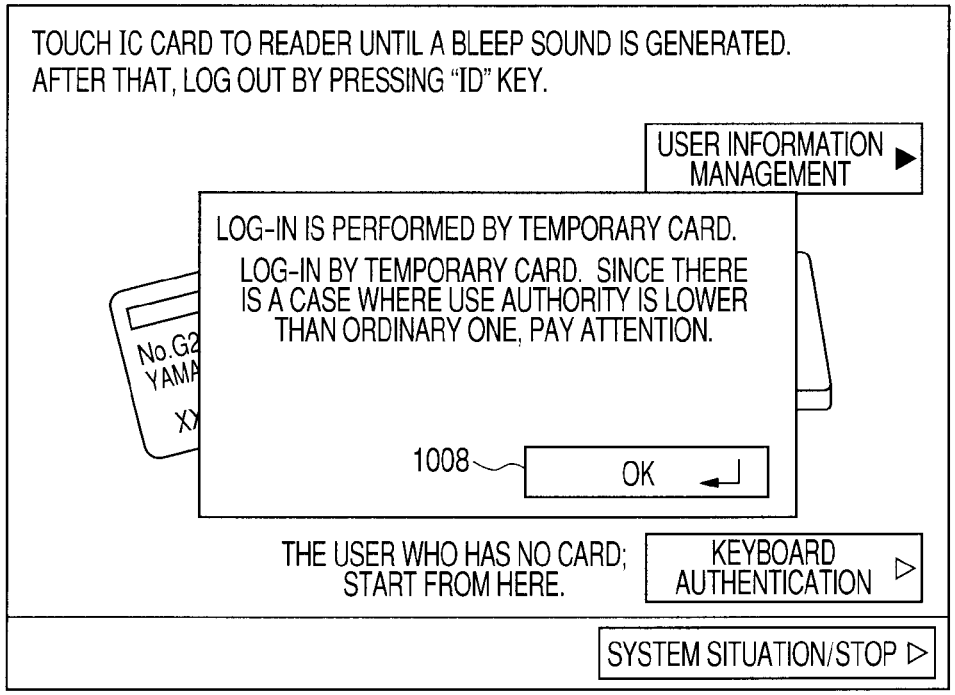
FIG. 38 is an example of a temporary card authentication display screen.

If the IC card is the temporary card in step 315 (YES in step 315), the CPU 301 of the multifunction apparatus 3000 displays a temporary card authentication display screen as illustrated in FIG. 38 (step 316) and detects a depression of an OK button 1008 on the temporary card authentication display screen (step 317). After the detection, the temporary card authentication display screen illustrated in FIG. 38 is deleted (step 318).

After step 318 and when the IC card is not the temporary card in step 315 (NO in step 315), the CPU 301 of the multifunction apparatus 3000 logs in the multifunction apparatus 3000 by using the user information obtained in step 313 by the authentication processing unit 352. When the CPU 301 logs in the multifunction apparatus 3000, the functions which cannot be used in the multifunction apparatus 3000 are restricted according to the authority information (function restriction information) included in the authentication result received in step 313 and the display on the operating unit 308 is controlled. In the case of the temporary card, a weaker one of the authority for the temporary card and the authority for his own card, the weaker authority is applied. In the case of his own card, the authority for his own card is applied. If a plurality of roles exist in his own card, a stronger one of the authorities among a plurality of roles is applied.

As described above, in the image forming system (information processing system) according to the invention, the image forming system (information processing system) in which, when the IC card of his own user cannot be used due to some reasons, the temporary card can be operated while holding the safety and the administrator is unnecessary can be constructed. That is, since the multifunction apparatus 3000 holds the temporary card list, it can discriminate that the card which is used is the temporary card, when it is the temporary card, if the card has already been registered in another user, the registration of another user is forcedly deleted, and the temporary card can be registered into his own user. If some card information has already been registered in his own user, those card information is deleted and the temporary card is registered. The temporary card flag has been set in order to discriminate whether or not the temporary card is his ordinary own card.

The authenticating server discriminates whether or not the log-in has been performed by the temporary card. When the log-in is performed by the temporary card, the authority information registered for the temporary card and the authority information for the user who has already been authenticated are merged, and the authentication information including the authority information in which the weaker authority is preferentially applied can be constructed. That is, in the case of using the temporary card, as compared with the case of using the ordinary own card, the use authority of the multifunction apparatus 3000 can be set to be weaker.

Although the exemplary embodiments of the image forming system, image forming apparatus, authenticating server, and the like according to the invention have been described above with reference to the drawings, the invention is not limited to the foregoing embodiment. For example, although the embodiment uses the construction in which the temporary card list is previously registered in the multifunction apparatus 3000, it is also possible to use a construction in which the list is held on the authenticating server side. It is also possible to construct in such a manner that when the temporary card list is registered from the multifunction apparatus 3000, it can be designated on the user interface. Although the number of IC cards which can be registered into the IC card authenticating table of the authenticating server has been set to one irrespective of the card type (temporary card or ordinary card) in the embodiment, it is also possible to construct in such a manner that the card which is overwritten is limited only to the temporary card and the registration information of the ordinary card is not deleted. In such a case, it is also possible to construct in such a manner that, when the log-in is performed in the ordinary card, the authenticating server authenticates the ordinary card and the information of the temporary card which has been registered is deleted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-253382, filed Sep. 30, 2008, and Japanese Patent Application No. 2008-281196, filed Oct. 31, 2008, which are hereby incorporated by reference herein in their entirety.

The invention claimed is:

1. An image forming apparatus, which communicates through a communication medium with an authenticating server having storage that stores user identification information, the image forming apparatus comprising:
 a processor and memory operatively coupled to cooperate to function as:
  a read unit configured to read information stored in a storing medium;
  a receiving unit configured to receive user identification information;
  an obtaining unit configured to obtain storing medium identification information based on the information read by the read unit;
  a deletion requesting unit configured to, when it is determined that the obtained storing medium identification information indicates that the storing medium is temporarily allocated to a first user and the obtained storing medium identification information is already stored in the storage of the authenticating server in correspondence to user identification information of a second user, transmit to the authenticating server a request to delete the storing medium identification information stored corresponding to the user identification information of the second user, causing an authentication by using the storing medium by the second user to fail; and
  a first registration requesting unit configured to transmit a request including (a) the obtained storing medium identification information and (b) the user identification information received by the receiving unit, to the authenticating server, in order to store the obtained storing medium identification information into the storage in correspondence to the received user identification information, as storing medium identification information for the storing medium temporarily allocated to the first user.

2. An image forming apparatus according to claim 1, wherein the processor and memory cooperate to function as a second registration requesting unit that, when it is determined that the storing medium identification information does not indicate the storing medium which is temporarily allocated to the user, transmits the storing medium identification information to the authenticating server in order to store the storing medium identification information into the storage in correspondence to the user identification information received by the receiving unit as a storing medium which is ordinarily used.

3. An image forming apparatus according to claim 1, wherein the processor and memory cooperate to function as:
 a storing medium identification information list storing unit that stores a list of the storing medium identification information of the storing medium temporarily allocated to the user; and
 a storing medium discriminating unit that discriminates whether or not the storing medium identification information which coincides with the storing medium identification information obtained by the obtaining unit exists in the storing medium identification information list.

4. An image forming apparatus according to claim 1, wherein the processor and memory cooperate to function as:
 a function restriction information obtaining unit that, when a log-in is performed by the storing medium which is temporarily allocated to the user, obtains function restriction information for restricting available functions which have been set in correspondence to the storing medium identification information obtained by the obtaining unit; and
 a log-in unit that restricts the functions and logs in according to the function restriction information obtained by the function restriction information obtaining unit.

5. An image forming apparatus according to claim 4, wherein the function restriction information is formed by using: authority information which is allocated when the storing medium which is temporarily allocated to the user has been put over the image forming apparatus; and authority information which is allocated when a storing medium which is ordinarily used has been put over the image forming apparatus.

6. A processing method in an image forming apparatus, which communicates through a communication medium with an authenticating server having a storage which stores user identification information, the method comprising:
　　reading information stored in a storing medium;
　　receiving the user identification information;
　　obtaining storing medium identification information based on the information read in the reading step;
　　transmitting a request to the authenticating server to delete the storing medium identification information stored corresponding to user identification information of a second user, causing an authentication by using the storing medium by the second user to fail, when it is determined that the obtained storing medium identification information indicates that the storing medium is temporarily allocated to a first user and the obtained storing medium identification information is already stored in the storage of the authenticating server in correspondence to user identification information of the second user; and
　　transmitting a registering request including (a) the obtained storing medium identification information and (b) the user identification information to the authenticating server, in order to store the obtained storing medium identification information into the storage in correspondence to the received user identification information, as a storing medium identification information for the storing medium temporarily allocated to the first user.

7. A non-transitory computer-readable storing medium storing a computer-executable program for causing a computer to perform a processing method in an image forming apparatus, which communicates through a communication medium with an authenticating server having a user information storage that stores user identification information, the processing method comprising steps of:
　　reading information stored in a storing medium;
　　receiving the user identification information;
　　obtaining storing medium identification information based on the information read in the reading step;
　　transmitting a request to the authenticating server to delete the storing medium identification information stored corresponding to user identification information of a second user, causing an authentication by using the storing medium by the second user to fail, when it is determined that the obtained storing medium identification information indicates that the storing medium is temporarily allocated to a first user and the obtained storing medium identification information is already stored in the user information storage of the authenticating server in correspondence to user identification information of the second user; and
　　transmitting a registering request including (a) the obtained storing medium identification information and (b) the user identification information to the authenticating server, in order to store the obtained storing medium identification information into the user information storage in correspondence to the received user identification information, as a storing medium identification information for the storing medium temporarily allocated to the first user.

\* \* \* \* \*